US011982950B2

(12) United States Patent
Kawasaki

(10) Patent No.: US 11,982,950 B2
(45) Date of Patent: May 14, 2024

(54) POWER SUPPLY DEVICE AND IMAGE FORMING APPARATUS IMPLEMENTING RIPPLE VOLTAGE SUPPRESSION

(71) Applicant: Koichi Kawasaki, Kanagawa (JP)

(72) Inventor: Koichi Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/110,805

(22) Filed: Feb. 16, 2023

(65) Prior Publication Data

US 2023/0297001 A1 Sep. 21, 2023

(30) Foreign Application Priority Data

Mar. 15, 2022 (JP) ................................ 2022-040704

(51) Int. Cl.
*G03G 15/02* (2006.01)
*G03G 15/00* (2006.01)

(52) U.S. Cl.
CPC ..... *G03G 15/0266* (2013.01); *G03G 15/5004* (2013.01); *G03G 15/5037* (2013.01); *G03G 2215/00071* (2013.01)

(58) Field of Classification Search
USPC ........................................................ 399/66
See application file for complete search history.

(56) References Cited

U.S. PATENT DOCUMENTS

2019/0346789 A1 11/2019 Kawasaki
2020/0241437 A1 7/2020 Kawasaki

FOREIGN PATENT DOCUMENTS

JP 2010-244019 10/2010
JP 2015201935 A * 11/2015
JP 2021-096427 6/2021
WO 2021206791 A1 10/2021

OTHER PUBLICATIONS

European Search Report; Application EP23158355; Nov. 2, 2023.

* cited by examiner

*Primary Examiner* — Quana Grainger
(74) *Attorney, Agent, or Firm* — Duft & Bornsen, PC

(57) ABSTRACT

A power supply device that applies a voltage in which a direct-current (DC) voltage and an alternating-current (AC) voltage are superimposed on each other to a charging member that charges an image bearer, includes: an AC voltage generation circuit that generates the AC voltage; a DC voltage generation circuit that generates the DC voltage; a DC current detection circuit provided on an output terminal side of the DC voltage generation circuit, which detects an output DC current flowing into the image bearer; and a reduction circuit that reduces an inflow of an AC current to the DC current detection circuit.

8 Claims, 26 Drawing Sheets

RIPPLE VOLTAGE GENERATED IN DETECTOR

REVERSE WAVEFORM OF RIPPLE VOLTAGE

VOLTAGE DETECTED BY DETECTOR

FIG. 13 γ
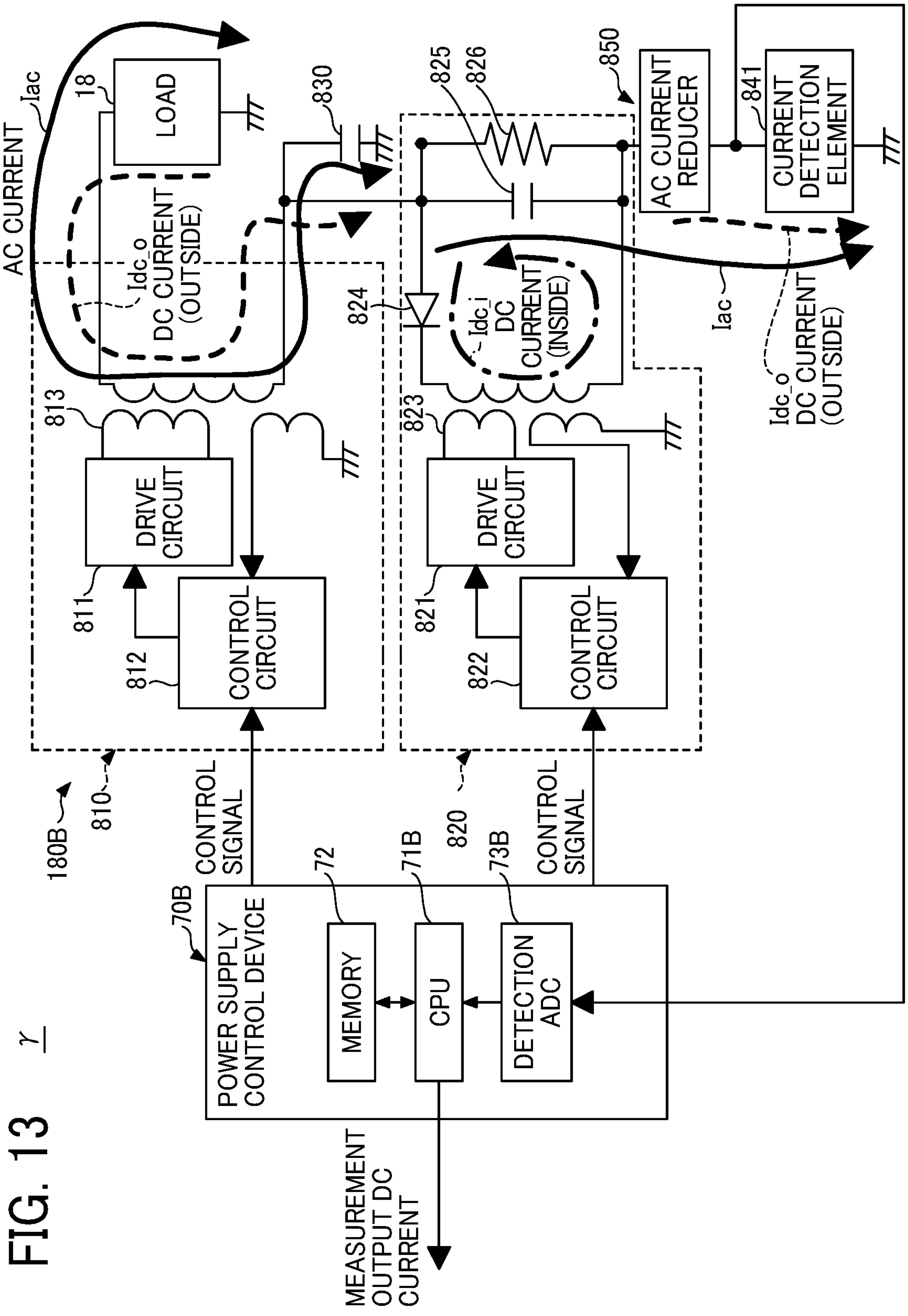

FIG. 26

| CHARGING AC FREQUENCY | OUTPUT VALUE | MEASUREMENT POINT | DEVIATION AMOUNT FROM AVERAGE VALUE |
|---|---|---|---|
| 1700 Hz | 700 V | AFTER 0.1 ms FROM 0 sec | 10 mV |
| 1700 Hz | 1050 V | AFTER 0.1 ms FROM 0 sec | 15 mV |
| 1700 Hz | 1400 V | AFTER 0.1 ms FROM 0 sec | 20 mV |

POWER SUPPLY DEVICE AND IMAGE FORMING APPARATUS IMPLEMENTING RIPPLE VOLTAGE SUPPRESSION

CROSS-REFERENCE TO RELATED APPLICATIONS

This patent application is based on and claims priority pursuant to 35 U.S.C. § 119(a) to Japanese Patent Application No. 2022-040704, filed on Mar. 15, 2022, in the Japan Patent Office, the entire disclosure of which is hereby incorporated by reference herein.

BACKGROUND

Technical Field

The present disclosure relates to a power supply device, and an image forming apparatus including the power supply device and a charging member.

Related Art

In related art, a known electrophotographic image forming apparatus has an alternating-current (AC) charging system in which a direct-current (DC) voltage and an AC voltage are superimposed on each other and applied to a charging member to charge an image bearer such as a photoconductor drum.

The known image forming apparatus of the AC charging system detects the output DC current of a power supply using a current detection circuit disposed in a charging power supply that applies a voltage to the charging member to obtain the surface potential of the image bearer that is charged by the charging member.

For example, as illustrated in FIG. 1, Japanese Patent No. 5546269 discloses that an AC voltage generator 91 serving as a high voltage section of a charging power supply 90 and including a current detector 93 performs current detection. Since the AC voltage is superimposed on the DC voltage, the current detector 93 extracts a DC current and then measures the DC current using a high withstand voltage element, extracts a current through insulation and measures the current, or drops a high potential to a low potential and measures a current. When the high voltage section detects the current, a detection path for detecting the current has a complicated circuit and is costly in any case.

In contrast, as illustrated in FIG. 2, Japanese Unexamined Patent Application Publication No. 2021-096427 discloses a configuration in which an AC voltage is superimposed on a DC voltage and a current detector 98 that detects an output DC current is provided at an output portion of a DC voltage generator 97 that is a low voltage section of a charging power supply 95. With this configuration, since the current detector 98 is provided in the low voltage section, the current can be detected inexpensively and more easily.

However, Japanese Unexamined Patent Application Publication No. 2021-096427 has not considered an inflow current of an AC voltage to the current detector 98. Thus, an error may occur due to a ripple voltage caused by the AC current flowing into the current detector 98 depending on the number of samplings. Specifically, FIGS. 3A and 3B illustrate waveforms presenting the reason why there is a difference in average value due to a difference in sampling rate when a voltage with an AC voltage flowing thereinto is detected. As illustrated in FIG. 3A, when the number of samplings is large at a sufficiently high sampling rate with respect to the ripple voltage frequency, the detected voltage on average is equivalent to an original average voltage. However, as illustrated in FIG. 3B, when a sufficient sampling rate is not obtained and the number of samplings is small, deviated points are detected and averaged, and hence a value deviated from the original average voltage is obtained. Thus, when a sufficient sampling rate is not obtained, the maximum error value is a difference Vpp between the maximum value and the minimum value of the ripple voltage.

In contrast, when a sufficient sampling rate is provided with respect to the ripple frequency to increase the number of samplings, the detection error generated due to the ripple voltage is suppressed. However, to implement sampling at a high frequency, the occupancy of the central processing unit (CPU) increases, and a high-performance CPU is desired.

SUMMARY

Embodiments of the present disclosure include a power supply device that applies a voltage in which a direct-current (DC) voltage and an alternating-current (AC) voltage are superimposed on each other to a charging member that charges an image bearer. The power supply device includes an AC voltage generation circuit that generates the AC voltage; a DC voltage generation circuit that generates the DC voltage; a DC current detection circuit that is provided on an output terminal side of the DC voltage generation circuit and that detects an output DC current flowing into the image bearer; and a reduction circuit that reduces an inflow of an AC current to the DC current detection circuit.

Embodiments of the present disclosure include a power supply device that applies a voltage in which a DC voltage and an AC voltage are superimposed on each other to a charging member that charges an image bearer. The power supply device includes an AC voltage generation circuit that generates the AC voltage; a DC voltage generation circuit that generates the DC voltage; a DC current detection circuit that is provided on an output terminal side of the DC voltage generation circuit and that detects an output DC current flowing into the image bearer; and a reverse waveform applicator circuit that applies a reverse phase waveform of a ripple voltage expected in the DC current detection circuit to the DC current detection circuit.

Embodiments of the present disclosure include a power supply device that applies a voltage in which a DC voltage and an AC voltage are superimposed on each other to a charging member that charges an image bearer. The power supply device includes an AC voltage generation circuit that generates the AC voltage; a DC voltage generation circuit that generates the DC voltage; and a control device that is connected to an output terminal side of the DC voltage generation circuit and that outputs a control signal for causing the AC voltage generation circuit to generate a designated AC voltage and calculate an output DC current flowing into the image bearer. The control device includes an analog-to-digital (AD) converter circuit that is connected to the output terminal side of the DC voltage generation circuit and that detects a DC current; a ripple-voltage memory that stores in advance a ripple waveform to be generated per designated AC voltage of the control signal; and processing circuitry that expects a ripple waveform to be generated based on an ongoing control signal, calculates a reverse waveform of the expected ripple waveform, and sets a value obtained by adding the calculated reverse waveform to a DC current including a detected ripple as the output DC current.

Embodiments of the present disclosure include an image forming apparatus including the power supply device; an image bearer; a charging member that charges the image bearer; and a control device that calculates a surface potential of the image bearer based on the output DC current.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 13 is a diagram illustrating a configuration and a flow of current of a power supply device according to a third embodiment;

FIG. 26 is a correlation table for an output and a voltage of a ripple-voltage described in FIG. 25;

Figure 1:
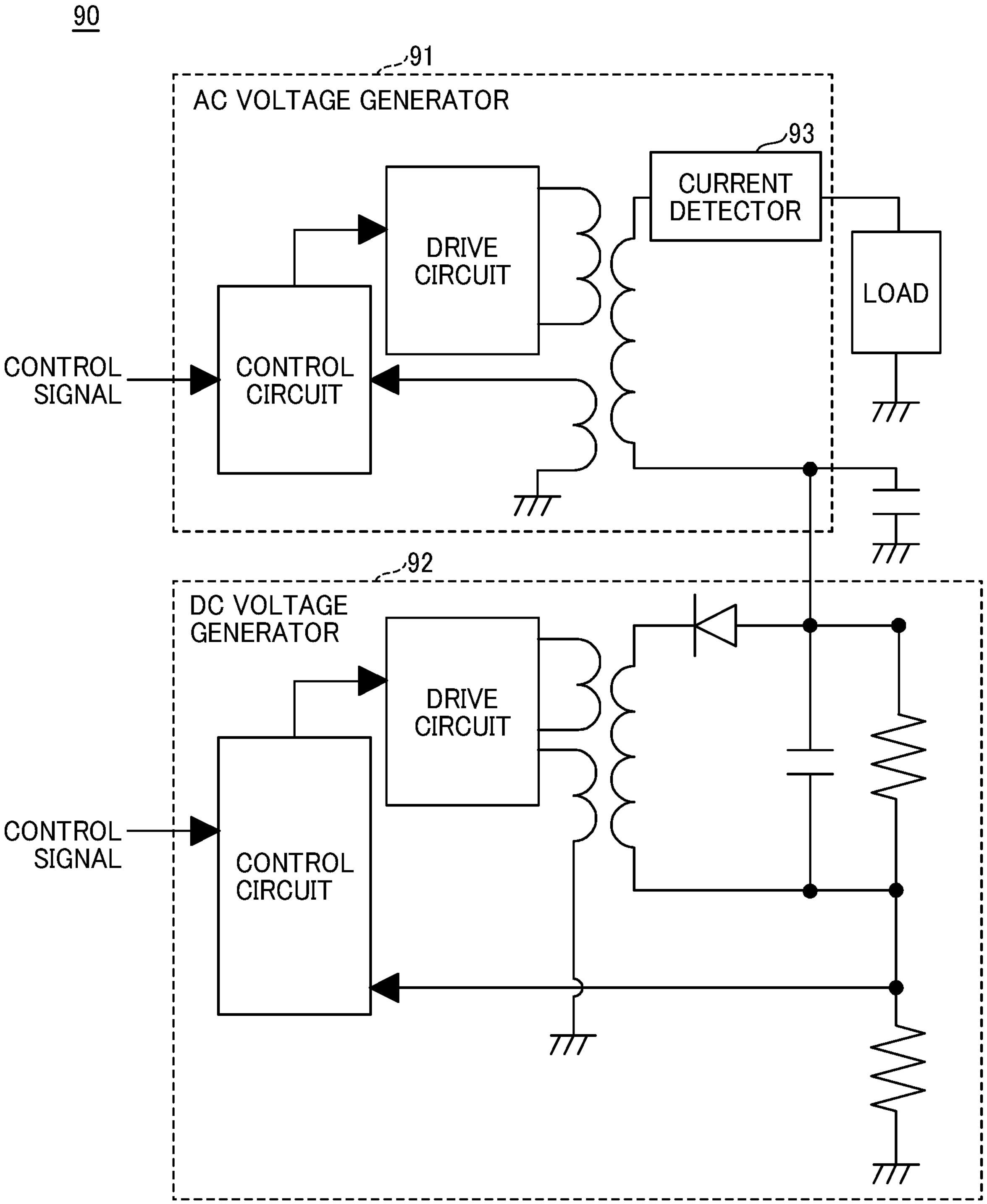
FIG. 1 RELATED ART
FIG. 1 is a diagram illustrating a configuration example of a charging power supply according to a first related-art example.
Figure 2:
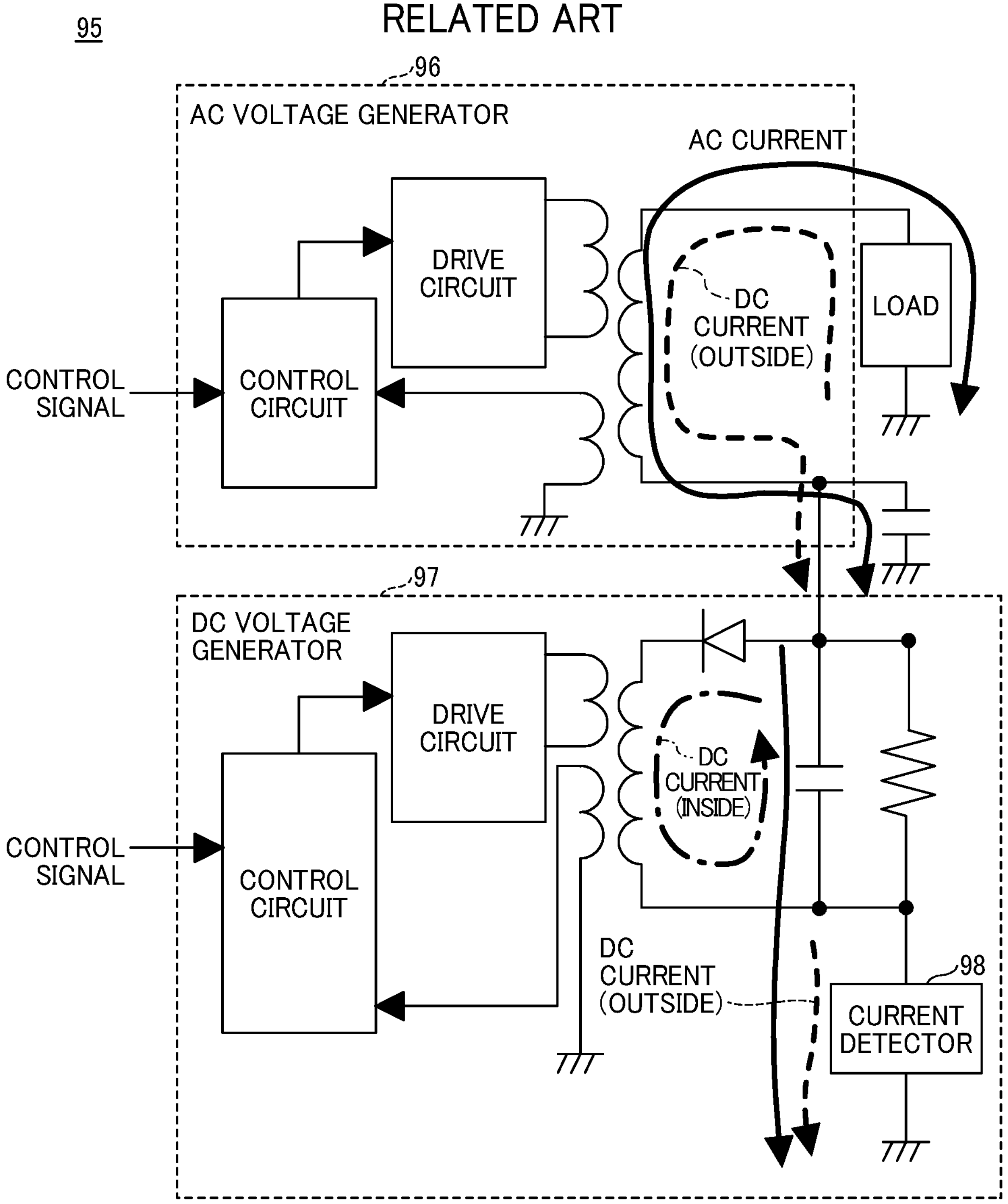
FIG. 2 RELATED ART
FIG. 2 is a diagram illustrating a configuration example of a charging power supply according to a second related-art example.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Embodiments of the present disclosure are described referring to the drawings. Like reference signs are applied to identical or corresponding components throughout the drawings and redundant description thereof may be omitted.

Hereinafter, an embodiment is described with reference to an example of an electrophotographic image forming apparatus including a secondary transfer mechanism having a tandem system. The image forming apparatus is a multifunction peripheral (MFP) printer product having a copy function, a print function, a facsimile function, and so forth, mounted in a housing.

General Arrangement Example of Image Forming Apparatus 100

Figure 4:
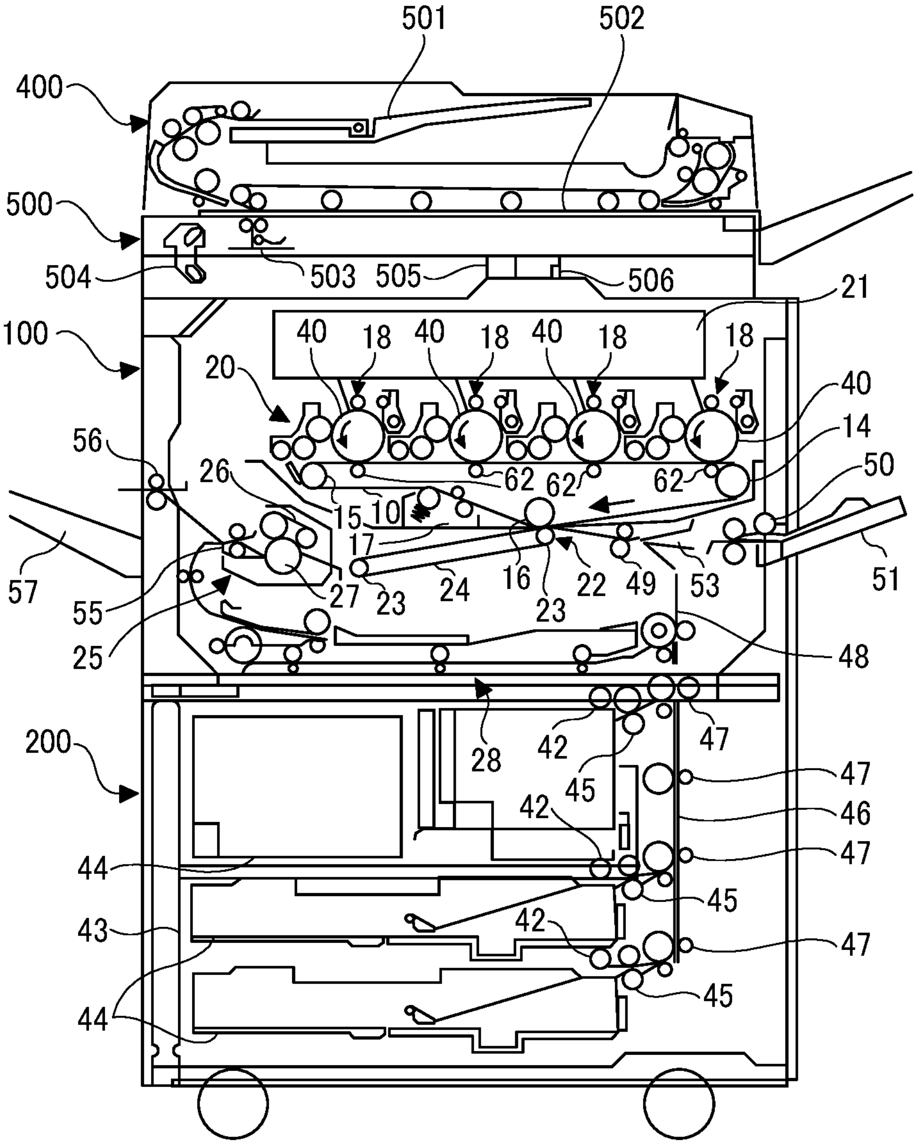
FIG. 4 is a view illustrating a general arrangement example of an image forming apparatus according to an embodiment of the disclosure.

FIG. 4 is a view illustrating a general arrangement example of an image forming apparatus 100. The image forming apparatus 100 includes an intermediate transfer unit in a center portion thereof. The intermediate transfer unit includes an intermediate transfer belt 10 that is an endless belt. The intermediate transfer belt 10 extends around a first support roller 14, a second support roller 15, and a third support roller 16, and is rotationally driven clockwise.

The image forming apparatus 100 further includes an intermediate transfer body cleaning unit 17 disposed rightward of the second support roller 15 to remove residual toner remaining on the intermediate transfer belt 10 after a toner image is transferred onto a recording medium P.

An image forming section 20 including a yellow (Y) image forming section, a magenta (M) image forming section, a cyan (C) image forming section, and a black (K) image forming section is provided to face the intermediate transfer belt 10 disposed between the first support roller 14 and the second support roller 15. The image forming sections of the respective colors are arranged side by side in a travel direction of the intermediate transfer belt 10.

The image forming sections of the respective colors have configurations similar to each other except that the colors of toner to be used are different from each other. Accordingly, in the description and drawings below, the suffixes "Y", "M", "C", and "K", each representing the color of toner, are omitted unless the color is discriminated. The image forming apparatus 100 may also include a white (W) image forming section on the upstream side of the yellow (Y) image forming section in the travel direction of the intermediate transfer belt 10; however, the illustration is omitted in FIG. 4.

The image forming section 20 includes, for each color, a photoconductor 40, a charging roller 18 serving as an example of a charging member, a developing unit, and a cleaning unit, and is detachably attached to the image forming apparatus 100. In this case, the photoconductor 40 is an example of an image bearer.

The image forming apparatus 100 also includes a light beam scanner 21 above the image forming section 20. The light beam scanner 21 irradiates the photoconductors 40 of the respective colors with light beams (laser beams) for image formation to form electrostatic latent images (latent images) corresponding to image data on the photoconductors 40 of the respective colors.

The electrostatic latent images on the photoconductors 40 of the respective colors are developed by the developing units. The developed toner images of the respective colors are superimposed and primarily transferred onto the intermediate transfer belt 10. Thus, a color toner image is formed on the intermediate transfer belt 10. The toner image is borne by the intermediate transfer belt 10 and moved (conveyed) in the travel direction of the intermediate transfer belt 10. The configuration of the image forming section 20 will be described later in detail referring to FIG. 5.

The image forming apparatus 100 includes a secondary transfer unit 22 below the intermediate transfer belt 10.

The secondary transfer unit 22 includes a secondary transfer belt 24 that is an endless belt, extending around two rollers 23, and disposed to press up the intermediate transfer belt 10 against the third support roller 16. The secondary transfer belt 24 can secondarily transfer the toner image formed on the intermediate transfer belt 10 onto a recording medium P.

The image forming apparatus 100 also includes a fixing unit 25 on a lateral side of the secondary transfer unit 22. The fixing unit 25 fixes the toner image on the recording medium P, which has been conveyed in a state with the toner image secondarily transferred, to the recording medium P. The fixing unit 25 includes a fixing roller 26 that is an endless belt and a pressure roller 27, and can fix the toner image transferred on the surface of the recording medium P to the recording medium P by the heat and pressure of the fixing roller 26 and the pressure roller 27.

The image forming apparatus 100 further includes, below the secondary transfer unit 22 and the fixing unit 25, a sheet inversion unit 28 that inverts the front and back sides of the recording medium P and sends the recording medium P to form an image also on the back side of the recording medium P immediately after the image is formed on the front side.

Next, a series of flows of forming an image on a recording medium Pin the image forming apparatus 100 is described.

When a start button of "copy" in an operation unit (illustration being omitted) is pressed, in a case where a document is placed on a document feeding table 501 of an auto document feeder (ADF) 400 serving as an automatic document feeder, the image forming apparatus 100 causes the ADF 400 to convey the document onto a contact glass 502. In contrast, in a case where a document is not placed on the document feeding table 501, an image reading unit 500 including a first carriage 503 and a second carriage 504 is driven to read a document manually placed on the contact glass 502.

In the image reading unit 500, a light source included in the first carriage 503 irradiates the contact glass 502 with light. The reflected light from the document surface is reflected by a first mirror included in the first carriage 503 toward the second carriage 504, and is reflected by a second mirror included in the second carriage 504. The reflected light from the document surface forms an image on an imaging surface of a charge coupled device (CCD) 506 that is a reading sensor, by an imaging lens 505. The CCD 506 captures an image of the document surface, and generates image data of each color of Y, M, C, and K based on an image signal of the image captured by the CCD 506.

When a start button of "print" is pressed, when an instruction to form an image is provided from an external device such as a personal computer (PC), or when an instruction to output a facsimile (fax) is provided, the image forming apparatus 100 starts the rotational driving of the intermediate transfer belt 10, and prepares for image formation of each unit of the image forming section 20.

Then, the image forming apparatus 100 starts an image formation process for each color. The photoconductors 40 for the respective colors are irradiated with laser beams modulated based on image data of the respective colors to form electrostatic latent images. Then, the toner images of the respective colors obtained by developing the electrostatic latent images are superimposed on each other and formed as an image on the intermediate transfer belt 10.

Then, a recording medium P is sent to the secondary transfer unit 22 at a certain timing so that the leading end of the recording medium P enters the secondary transfer unit 22 at a timing at which the leading end of the toner image on the intermediate transfer belt 10 enters the secondary transfer unit 22. Then, the toner image on the intermediate transfer belt 10 is secondarily transferred onto the recording medium P by the secondary transfer unit 22. The sheet with the toner image secondarily transferred thereon is sent to the fixing unit 25, and the toner image is fixed to the recording medium P.

Sheet feeding of a recording medium P to the secondary transfer position is described. One of sheet feeding rollers 42 of a sheet feeding table 200 is rotationally driven to feed recording media P from one of sheet feeding trays 44 provided in multiple stages in a sheet feeding unit 43. Then, one of the recording media P is separated by a separation roller 45, enters a conveyance roller unit 46, and is conveyed by a conveyance roller 47. Then, the recording medium P is guided to a conveyance roller unit 48 in the image forming apparatus 100, is abutted against a registration roller 49 of the conveyance roller unit 48 and is temporarily stopped. Then, the recording medium P is sent to the secondary transfer unit 22 in synchronization with the timing of the secondary transfer as described above.

Also, a user can insert a recording medium P into a manual sheet feeding tray 51 and feed the recording medium P. When the user inserts recording media P into the manual sheet feeding tray 51, the image forming apparatus 100 rotationally drives a sheet feeding roller 50 to separate one of the recording media P on the manual sheet feeding tray 51 and to draw the separated recording medium P into a manual sheet feeding path 53. Like the above-described configuration, the recording medium P is abutted against the registration roller 49 and temporarily stopped, and then is sent to the secondary transfer unit 22 in synchronization with the timing of the secondary transfer as described above.

The recording medium P fixed by the fixing unit 25 and ejected is guided to an ejection roller 56 by a switching claw 55, is ejected by the ejection roller 56, and is stacked on a sheet ejection tray 57. Alternatively, the recording medium P is guided to the sheet inversion unit 28 by the switching claw 55, inverted by the sheet inversion unit 28, and guided to the secondary transfer position again. Then, an image is also formed on the back side of the recording medium P, and then the recording medium P is ejected onto the sheet ejection tray 57 by the ejection roller 56.

Residual toner remaining on the intermediate transfer belt 10 after the image transfer is removed by the intermediate transfer body cleaning unit 17 to prepare for next image formation.

The image forming apparatus 100 can form a color image on a recording medium P in this way.

Configuration of Image Forming Section 20

Figure 5:
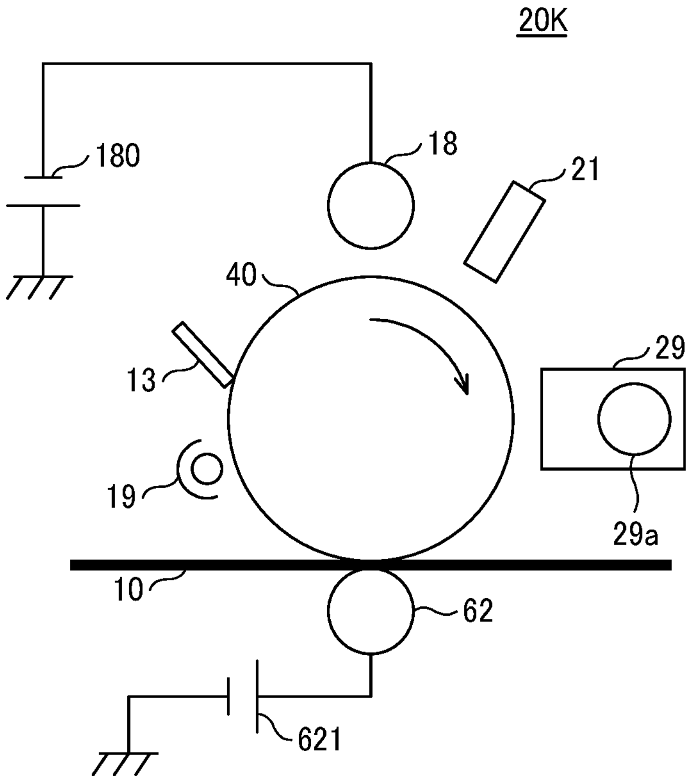
FIG. 5 is a diagram illustrating a configuration example of an image forming device according to the embodiment.

The image forming section 20 included in the image forming apparatus 100 is described next. FIG. 5 is a diagram illustrating a configuration example of the image forming section 20. FIG. 5 illustrates a configuration example of the image forming section 20K for black. The image forming sections 20Y, 20M, and 20C of the other three colors have the same configuration as that of the image forming section 20K for black except that the colors of toner used in the image formation processes are different. Thus, illustration and description for the image forming sections 20Y, 20M, and 20C are omitted, and the image forming section 20K for black is described.

The image forming section 20K includes the photoconductor 40, the charging roller 18, a developing device 29, a cleaning blade 13, and a charge remover 19.

The photoconductor (photoconductor drum) 40 is a drum-shaped organic photoconductor charged to a negative polarity. The photoconductor 40 includes a photoconductive layer overlaying a drum-shaped conductive support body. The photoconductor 40 includes multiple layers including the conductive support body that functions as a base layer, an undercoat layer that functions as an insulation layer, a charge generation layer and a charge transport layer that function as a photoconductive layer, and a surface layer (i.e., a protection layer). The undercoat layer is overlaid on the photoconductive support body, the charge generation layer and the charge transport layer are overlaid on the undercoat layer, and the surface layer is formed on top of the charge generation layer and the charge transport layer. The conductive support body of the photoconductor 40 may use a conductive material having a volume resistance of 1010 Ωcm or less.

The charging roller 18 is a roller member including a conductive cored bar and an elastic layer of moderate resistivity covering an outer circumference of the conductive cored bar. A charging bias in which an AC voltage is superimposed on a DC voltage is applied from a charging high-voltage power supply 180 to the charging roller 18, so that the surface of the photoconductor 40 facing the charging roller 18 is charged. A cleaning roller that removes dirt from the charging roller 18 may be provided in contact with the charging roller 18.

The developing device 29 includes a developing roller 29*a* facing the photoconductor 40. The developing roller 29*a* includes a magnet and a sleeve. The magnet includes a magnet roller or multiple magnets fixedly disposed inside the developing roller 29*a* and generates multiple magnetic poles around a circumferential surface of the developing roller 29*a*. The sleeve rotates about the magnet. The magnet forms multiple magnetic poles on (the sleeve of) the developing roller 29*a*, and a developer is borne on the developing roller 29*a*.

The cleaning blade 13 mechanically scrapes off extraneous matter, such as untransferred toner, adhering to the surface of the photoconductor 40. The cleaning blade 13 is a blade-shaped member made of a rubber material such as urethane rubber and formed in a substantially plate shape, and is in contact with the surface of the photoconductor 40 at a predetermined angle and with a predetermined pressure.

The charge remover 19 removes the charge on the surface of the photoconductor 40 after the toner image is transferred.

The photoconductor 40 charged by the charging roller 18 is exposed to light by the light beam scanner 21 in accordance with image data. Thus, an electrostatic latent image is formed on the surface of the photoconductor 40. The developing device 29 applies toner to the electrostatic latent image formed on the surface of the photoconductor 40. Thus, a toner image is developed on the surface of the photoconductor 40.

A voltage generated by a transfer high-voltage power supply 621 is applied to a primary transfer roller 62, and hence the toner image on the surface of the photoconductor 40 is primarily transferred onto the intermediate transfer belt 10. The toner image on the intermediate transfer belt 10 is transferred onto a recording medium P by the secondary transfer unit 22, and is fixed to the recording medium P by the fixing unit 25. Residual toner and so forth on the surface of the photoconductor 40 is removed by the cleaning blade 13. The charge on the surface of the photoconductor 40 is removed by the charge remover 19.

In the case of color printing, four similar configurations are provided for respective colors, toner images are transferred onto the intermediate transfer belt 10 on a per-color basis, and then a secondary transfer and a fixing process are executed.

According to the embodiment, the charging roller 18 is disposed close to the photoconductor 40 in a non-contact state with respect to the photoconductor 40. The charging system in which a very small gap is set between the photoconductor 40 and the charging roller 18 is referred to as a non-contact charging system. According to this system, as compared to a contact charging system in which the photoconductor 40 and the charging roller 18 are used in contact with each other, a foreign substance such as toner or lubricant remaining on the photoconductor 40 is less likely to adhere to the charging roller 18, thereby providing an advantageous effect of suppressing charging unevenness due to adhesion of a foreign substance. However, the charging system in the embodiment is not limited to the non-contact charging system, and may be a contact charging system.

Charging High-Voltage Power Supply According to First Embodiment

Figure 6:
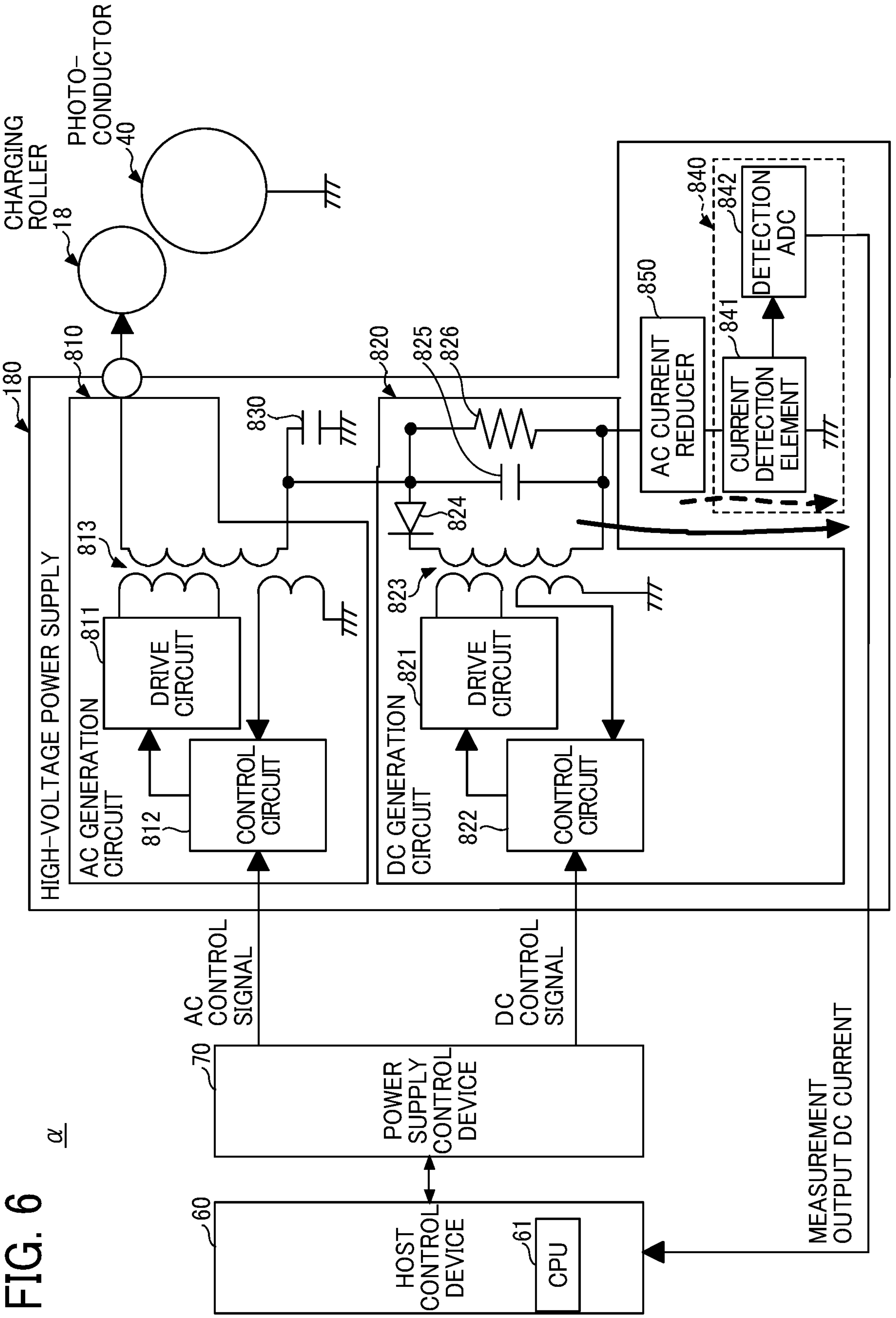
FIG. 6 is a diagram illustrating a section from control of a charging high-voltage power supply to a charging unit according to a first embodiment.

A flow of power supply to the charging roller 18 is described next with reference to FIG. 6. FIG. 6 is a diagram illustrating a section from control of a high-voltage power supply to a charging unit according to a first embodiment.

As illustrated in FIG. 6, the charging roller 18 and a power supply control device 70 that is a host controller that controls a charging operation are connected to the charging high-voltage power supply 180. The combination of the charging high-voltage power supply 180 and the power supply control device 70 is referred to as a power supply device α.

The charging high-voltage power supply 180 mainly includes an alternating-current (AC) generation circuit 810 and a direct-current (DC) generation circuit 820. The DC voltage that is output from the charging high-voltage power supply 180 is from 100 V to 2000 V, the AC voltage (AC_Vout) that is output from the charging high-voltage power supply 180 is from 500 Vpp to 3500 Vpp, and a drive frequency (f) is from about 500 Hz to 3000 Hz.

First, in response to an AC control signal and a DC control signal that are commands from a CPU 71 of the power supply control device 70, the AC generation circuit 810 and the DC generation circuit 820 of the charging high-voltage power supply 180 operate to generate high voltages.

The charging high-voltage power supply 180 applies a voltage in which an AC voltage (alternating voltage) is superimposed on a DC voltage (direct voltage) to the charging roller 18, so that the charging roller 18 charges the photoconductor 40 serving as an image bearer.

Figure 7:
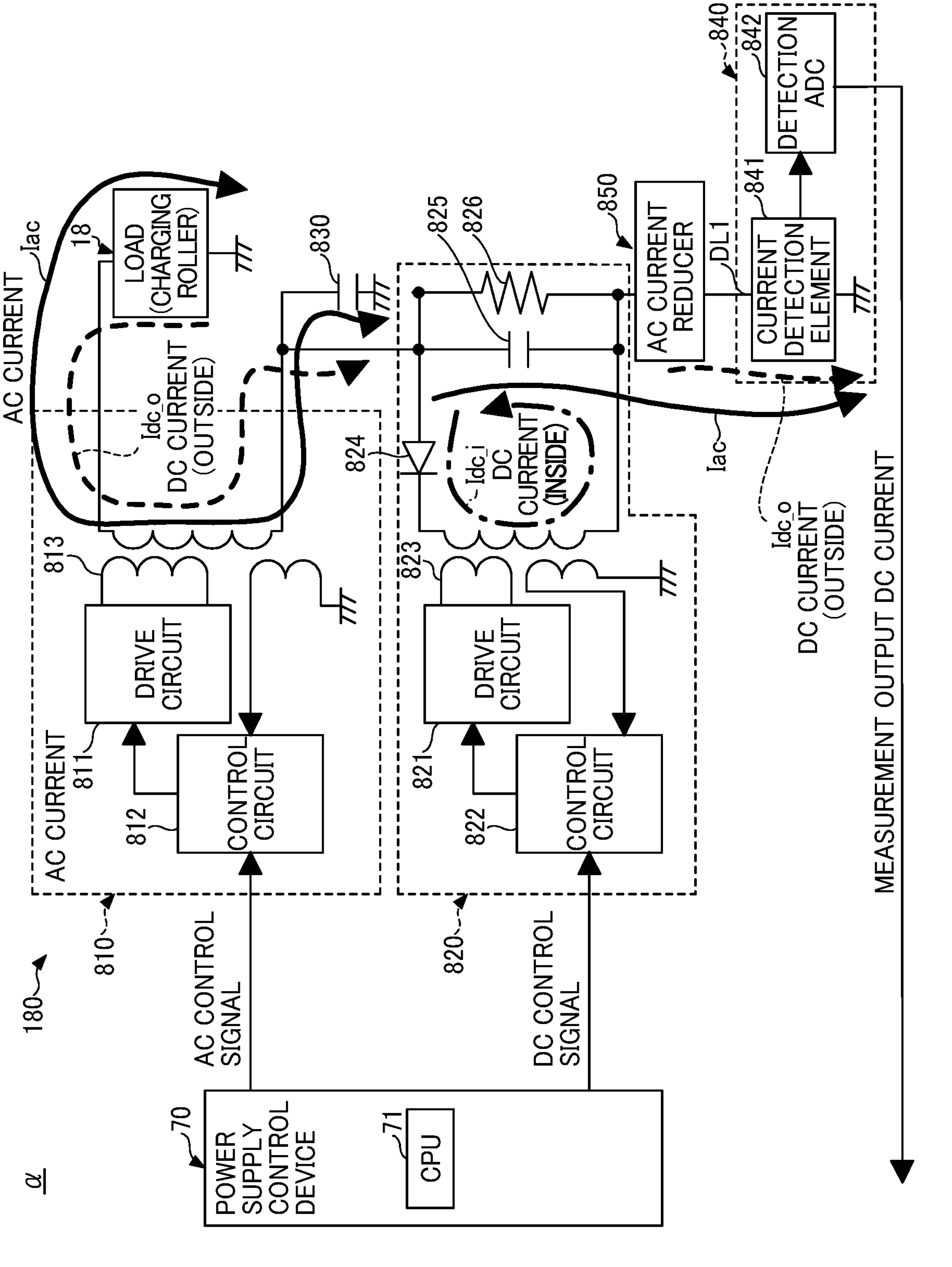
FIG. 7 is a diagram illustrating a configuration and a flow of current of a power supply device according to the first embodiment.

FIG. 7 is a diagram illustrating a configuration and a flow of current of the power supply device α according to the first embodiment. The power supply device α is described in detail referring to FIGS. 6 and 7.

The charging high-voltage power supply 180 includes a coupling capacitor 830, a DC current detector 840, and an AC current reducer 850 in addition to the above-described AC generation circuit 810 and DC generation circuit 820.

The AC generation circuit 810 is an example of an AC voltage generator, and is an electric circuit that generates a designated AC voltage based on the AC control signal input from the power supply control device 70. The AC generation circuit 810 includes a drive circuit 811, a control circuit 812, and an AC transformer 813.

The drive circuit 811 is an electric circuit that drives the AC transformer 813.

The AC transformer 813 is driven by the drive circuit 811 to generate an AC voltage.

The primary side of the AC transformer 813 includes a double-wound coil. One end of the secondary-side coil of the AC transformer 813 is connected to the charging roller 18 serving as a load, and the other end thereof is connected to each of the DC generation circuit 820 (one end of the secondary-side coil of a DC transformer 823) and the coupling capacitor 830.

The AC voltage generated by the AC transformer 813 is superimposed on the DC voltage generated by the DC generation circuit 820, and the superimposed voltage is applied to the charging roller 18.

The control circuit 812 supplies a drive-circuit control signal to the drive circuit 811 based on the amount of current generated in the double-wound coil of the AC transformer 813 to control the AC voltage generated by the AC transformer 813. Thus, the AC voltage generated by the AC transformer 813 meets a target voltage indicated by the AC control signal input from the host power supply control device 70.

The coupling capacitor 830 serving as an example of a coupling capacitor is provided between the AC generation circuit 810 and the DC generation circuit 820. One end of the coupling capacitor 830 is connected to the other end of the secondary-side coil of the AC transformer 813, and the other end of the coupling capacitor 830 is grounded.

Since the coupling capacitor 830 is arranged in this way, the AC current flowing between the AC generation circuit 810 and the charging roller 18 serving as the load mostly flows to the coupling capacitor 830, and is prevented from flowing into the DC generation circuit 820. As illustrated in FIG. 7, an AC current Iac indicated by an arrow that flows outside the power supply to the load 18 also flows to the coupling capacitor 830.

The coupling capacitor 830 also has a function of a bypass capacitor that allows just an AC current to flow therethrough.

The DC generation circuit 820 is an example of a DC voltage generator, and is an electric circuit that generates a designated DC voltage based on the DC control signal input from the power supply control device 70. The DC generation circuit 820 includes a drive circuit 821, a control circuit 822, a DC transformer 823, a diode 824, a rectifier capacitor 825, and a resistor 826.

Among these components, the drive circuit 821 is an electric circuit that drives the DC transformer 823. The DC transformer 823 is driven by the drive circuit 821 to generate a DC voltage that is higher than the input voltage from the input voltage.

The DC voltage generated by the DC transformer 823 is superimposed on the AC voltage generated by the AC generation circuit 810 and is applied to the load 18.

One end of the secondary-side coil of the DC transformer 823 is connected to the AC generation circuit 810 (the other end of the secondary-side coil of the AC transformer 813). The primary side of the DC transformer 823 includes a double-wound coil.

Both ends of the secondary-side coil of the DC transformer 823 are connected to the rectifier capacitor 825. Thus, the DC current flowing to the secondary side is divided into a DC current flowing outside the charging high-voltage power supply 180 and a DC current flowing inside the charging high-voltage power supply 180.

In FIG. 7, an arrow Idc_o indicates the DC current flowing outside the charging high-voltage power supply 180, and an arrow Idc_i indicates the DC current flowing inside the charging high-voltage power supply 180.

The control circuit 822 supplies a drive-circuit control signal to the drive circuit 821 based on the amount of current generated in the double-wound coil of the DC transformer 823 to control the DC voltage generated by the DC transformer 823.

For example, the control circuit 822 increases the control value of the drive circuit 821 when the amount of current generated in the double-wound coil of the DC transformer 823 is smaller than the amount of current corresponding to a target voltage indicated by the DC control signal input from the host power supply control device 70. In contrast, the control circuit 822 decreases the control value of the drive circuit 821 when the amount of current generated in the double-wound coil of the DC transformer 823 is larger than the amount of current corresponding to the target voltage indicated by the DC control signal input from the host power supply control device 70.

Accordingly, the control circuit 822 performs constant voltage control so that the output voltage of the DC generation circuit 820 meets the target voltage indicated by the DC control signal. The constant voltage control can be executed with a simple circuit configuration by using the amount of current generated in the double-wound coil of the DC transformer 823.

The diode 824, the rectifier capacitor 825, and the resistor 826 define a half-wave rectifier circuit that rectifies and smooths a half cycle of an AC voltage to obtain a DC voltage. The ripple appearing in the output voltage is equal to the frequency of the AC power supply.

The current output terminal of the half-wave rectifier circuit is provided with the DC current detector 840 via the AC current reducer 850. The AC current reducer 850 increases the impedance to reduce an AC component flowing toward the DC current detector 840 on the downstream side.

The DC current detector 840 is an output current detection circuit that is provided on the output terminal side (that is, downstream an output terminal) of the DC generation circuit 820 and that detects an output DC current, and includes a current detection element 841 and a detection analog-to-digital (AD) converter (hereinafter, referred to as detection ADC) 842.

The current detection element 841 is connected between the DC generation circuit 820 and a reference potential portion and hence is grounded. The current detection element 841 functions as a resistor for detecting a current in the detection ADC 842.

In the present embodiment, the detection ADC 842, which is a detection ADC circuit, detects the output DC current of the charging high-voltage power supply 180, and outputs a current detection signal indicating the output DC current to a host control device 60.

Potential information on the DC current detected by the detection ADC 842 of the DC current detector 840 is input to a CPU 61 (FIG. 6) of the host control device 60. The host control device 60 predicts a surface potential of the photoconductor 40 based on a measurement output DC current that is a charging DC current detected by the DC current detector 840.

Method of Calculating Surface Potential of Photoconductor

Described here is a calculation method of predicting the surface potential of the photoconductor 40 from the output DC current that is the charging DC current.

Since the photoconductor 40 is charged by accumulating a charge in the surface layer, charging the photoconductor 40 is considered equivalent to charging a capacitor. Thus, the following expression is established between a charge (Q) accumulated in the photoconductor 40 and a charging potential V. In the following expression, C denotes an electrostatic capacity of the photoconductor 40.

$$Q=CV \tag{1}$$

The charge Q accumulated in the photoconductor 40 is expressed by the following expression and can be converted.

$$Q=\int Idc\,dt \tag{2}$$

$$\int Idc\,dt=CV \tag{3}$$

Both sides are differentiated.

$$Idc=\frac{d}{dt}(CV) \tag{4}$$

In this case, a pre-charging photoconductor surface potential ($Vd_0$) and a charging application voltage ($V_c$) are constant. In charging with the AC voltage superimposed, an expression "charging application voltage $V_c$=ongoing photoconductor surface potential ($V_d$)" is established. Hence, the following expression (5) is established for the charging voltage V.

$$V=V_c-Vd_0=V_d-V_{d0} \tag{5}$$

The following expression is also established.

$$\frac{d}{dt}C=\frac{d}{dt}\left(\varepsilon\frac{S}{d}\right)=\frac{\varepsilon}{d}\cdot\frac{d}{dt}S=\frac{\varepsilon}{d}\cdot L\cdot\lambda \tag{6}$$

(In the expression, ε denotes a photoconductor-surface-layer dielectric constant, S denotes a photoconductor surface area contributing to charging, d denotes a photoconductor-surface-layer film thickness, L denotes a photoconductor length contributing to charging, and λ, denotes a linear velocity.) By transforming the relational expression (6), a DC component (Idc) of the charging current can derive the following expression using the photoconductor surface potential ($V_d$).

$$Idc=\frac{\varepsilon\cdot L\cdot\lambda}{d}(V_d-Vd_0) \tag{7}$$

In this case, since it is found that the photoconductor film thickness d hardly changes over time in the non-contact charging system, the film thickness d is constant, the dielectric constant ε and the photoconductor length L are also constant, and hence the DC component Idc of the charging current is proportional to the photoconductor surface potential V (correctly, $V_d$–$Vd_0$).

With such a calculation method, the host control device 60 can recognize the current flowing into the photoconductor 40, calculate the surface potential of the photoconductor 40, and perform image formation control or the like based on the measurement output DC current detected by the DC current detector 840.

AC Current Reducer

As described above, according to the present embodiment, the AC current reducer 850 is provided upstream of the DC current detector 840. The AC current reducer 850, which may also be referred to as a reduction circuit, serves as inflow reduction means and is provided upstream of the DC current detector 840 to reduce a ripple voltage caused by the AC current flowing into the DC current detector 840.

Specifically, although the coupling capacitor 830 originally serves as a bypass and prevents a large portion of the AC current from flowing to the DC current detector 840 side, the AC current may flow when the impedance of a first DC current detection line DL1 is low.

Thus, according to the present embodiment, the AC current reducer 850 is provided immediately upstream of the DC current detector 840. The AC current reducer 850 is, for example, a resistor. Providing a larger resistance value as the AC current reducer 850 can suppress the flow of the AC current.

In the DC current detector 840, it is further desirable to increase the resistance value of the resistor included in the current detection element 841 used for current detection.

Specifically, in a case where the AC output has a frequency of 1290 Hz, a voltage of 2200 Vpp, and a current of 2.7 mA, when the combination of the resistance values of the AC current reducer 850 and the current detection element 841 is 20 kΩ, the ripple voltage detected by the detection ADC 842 is about 50 mVpp.

When the combination of the resistance values of the AC current reducer 850 and the current detection element 841 is 56 kΩ, the ripple voltage detected by the detection ADC 842 is reduced to about 20 mVpp.

Thus, in the case where the resistance value is 20 kΩ, the value detected is to be considered with regard to the variation of the detection value of ±50 mV. In contrast, in the case of 56 kΩ, it is sufficient to consider the tolerance of the detection value of ±20 mV that is half or less compared to the case of 20 kΩ.

Figure 8A:
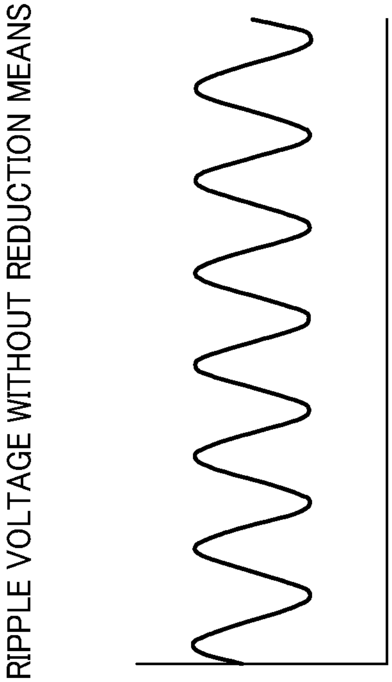
FIGS. 8A and 8B (FIG. 8) are diagrams illustrating a ripple voltage on an output DC current in a case with an AC current reducer of the first embodiment and in a case without the AC current reducer of the first embodiment.
Figure 8B:
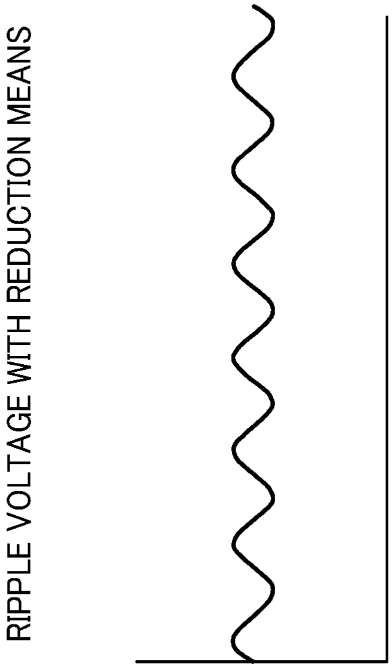

FIG. 8 illustrates a ripple voltage flowing into the detection ADC 842. FIG. 8A illustrates an example of a ripple voltage in the detection ADC 842 when reduction means, that is, the AC current reducer 850 is not provided, and FIG. 8B illustrates an example of a ripple voltage in the detection ADC 842 when reduction means, that is, the AC current reducer 850 is provided.

Figure 3A:
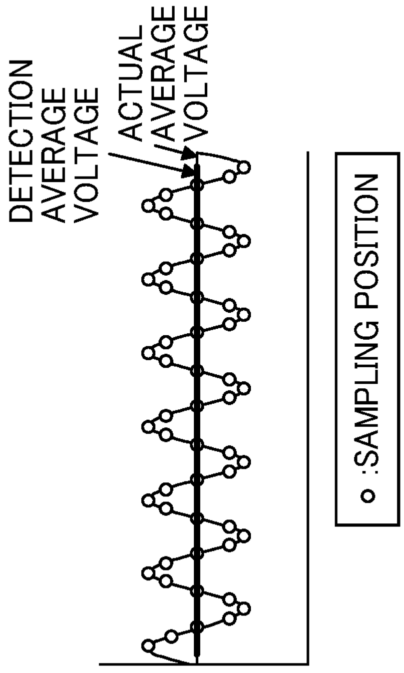
FIGS. 3A and 3B are diagrams illustrating waveforms presenting the reason why there is a difference in average value due to a difference in sampling rate when a voltage with an AC voltage flowing thereinto is detected.
Figure 3B:
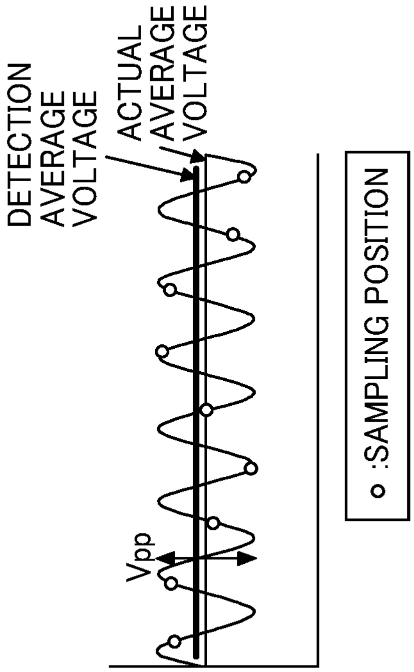

As illustrated in FIG. 8B, the AC current reducer 850 is added to suppress the inflow of the AC current and reduce (suppress) the ripple voltage of the potential of the detection ADC 842. Since the ripple width decreases in this way, the detection ADC 842 can accurately detect the output DC current even though reading (sampling) at a high speed as illustrated in FIG. 3B is not performed.

Although adding the AC current reducer 850 like the first embodiment has a certain advantageous effect as illustrated in FIG. 8, even with the addition of the AC current reducer 850, it is difficult to make the impedance infinite, and hence the ripple voltage caused by the AC current flowing to the DC current detector 840 does not become zero. In addition, it may be difficult to mount the AC current reducer for various reasons.

Thus, another method of reducing the error due to the ripple voltage of the output DC current detected by the DC current detector 840 is described below.

Second Embodiment

Figure 9:
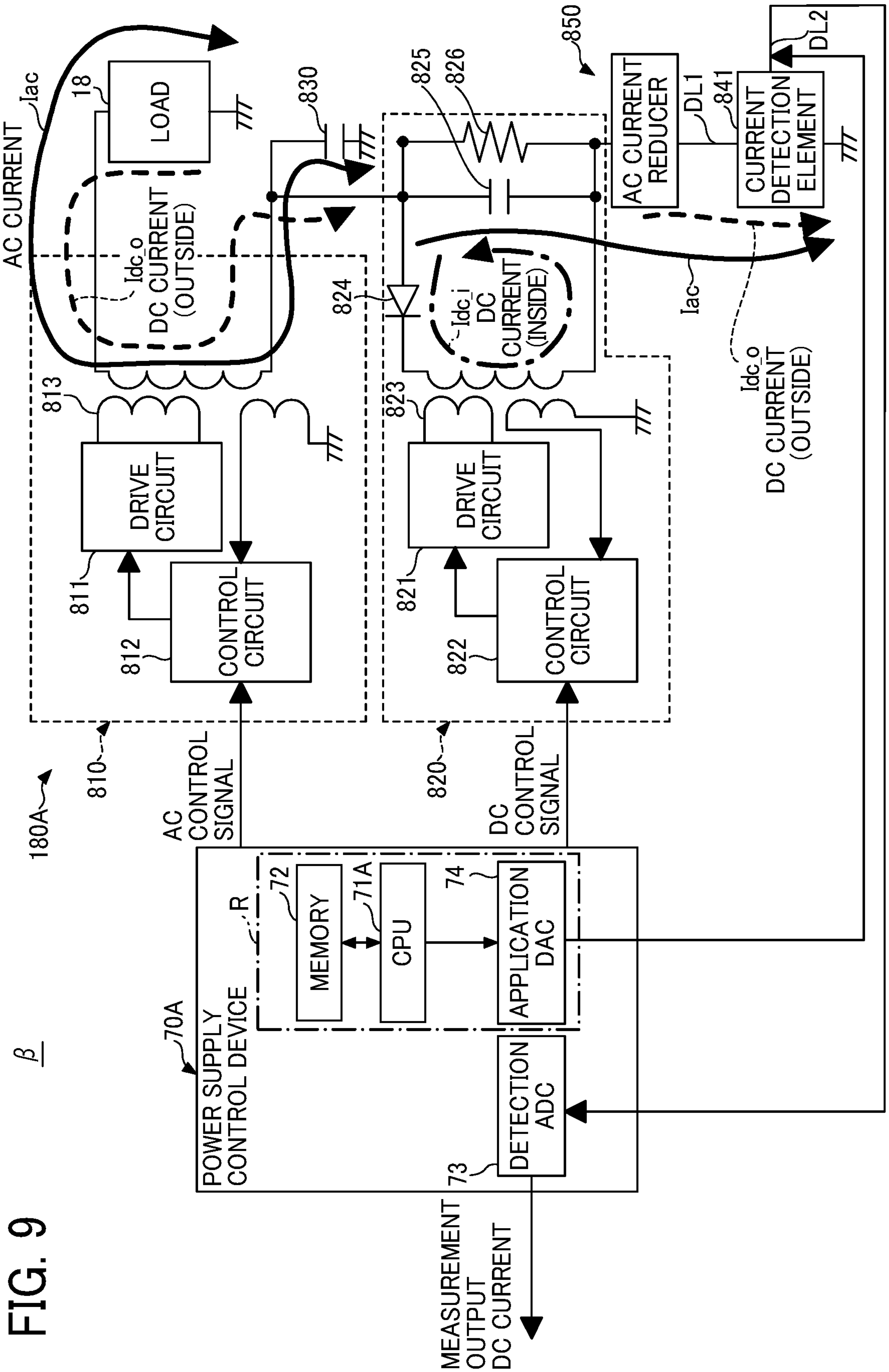
FIG. 9 is a diagram illustrating a configuration and a flow of current of a power supply device according to a second embodiment.
Figure 10:
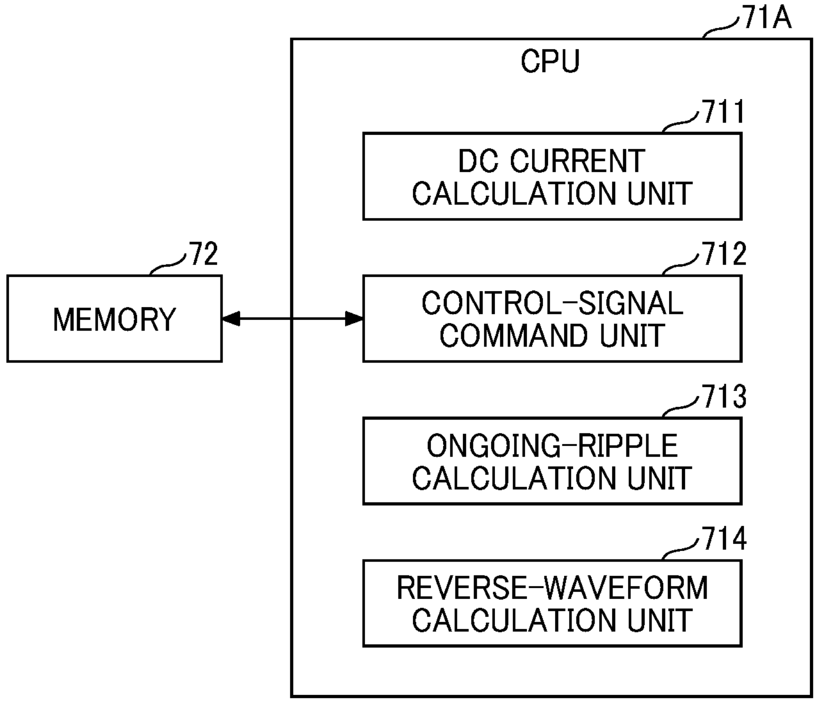
FIG. 10 is a functional block diagram illustrating functional blocks in a CPU of a power supply control device according to the second embodiment.

FIG. 9 is a diagram illustrating a configuration and a flow of current of a power supply device β according to a second embodiment. FIG. 10 is a functional block diagram of a CPU 71A of a power supply control device 70A.

In the second embodiment, a reverse waveform applicator (reverse waveform applicator circuit) is provided as means for suppressing the ripple voltage in the output DC current detected by the DC current detector 840. The reverse waveform applicator is implemented by the power supply control device 70A that is a host controller.

The reverse waveform applicator applies a reverse phase waveform (reverse waveform) of a ripple voltage expected in the DC current detector 840 to a second DC current detection line DL2 that connects the current detection element 841 to a detection ADC 73 of the power supply control device 70A.

In the present embodiment, the host control device 60 calculates a surface potential of the photoconductor 40 based on an output DC current (measurement output DC current) detected by the detection ADC 73 included in the power supply control device 70A, and performs image formation control or the like. The power supply control device 70A according to the present embodiment has a function of applying the reverse phase waveform of the expected ripple voltage to suppress the ripple voltage on the output DC current detected by the detection ADC 73.

The power supply control device 70A includes the CPU 71A, a memory 72, an AD converter 73 that is a detection ADC, and a digital-to-analog (DA) converter 74 that is an application DAC. Among these components, the CPU 71A, the memory 72, and the application DAC 74 function as a reverse waveform applicator R.

The memory 72 stores the relationship between a control signal that is an AC output value and a ripple voltage. Specifically, the memory 72 stores a ripple waveform expected to be generated, that is, a ripple waveform caused by an AC output based on the voltage of a generated AC current. The ripple waveform to be stored is obtained by measuring in advance how much ripple is generated depending on the voltage and current to be used, for each situation, and is stored in the memory 72.

The detection ADC 73 detects a DC current flowing to the second DC current detection line DL2. Since the detection ADC 73 is inside the power supply control device 70A and is connected to the output terminal side of the DC generation circuit 820, the detection ADC 73 also functions as a DC current detector that detects an output DC current flowing from a charging high-voltage device 180A into the photoconductor 40.

FIG. 10 illustrates functional blocks of the CPU 71A of the power supply control device 70A. Referring to FIG. 10, the CPU 71A serving as an arithmetic unit includes a DC current calculation unit 711, a control-signal command unit 712, an ongoing-ripple calculation unit 713, and a reverse-waveform calculation unit 714 in an executable manner.

The DC current calculation unit 711 calculates a DC current from a feedback voltage detected by the detection ADC 73.

The control-signal command unit 712 commands control signals (DC control signal, AC control signal). Specifically, the control-signal command unit 712 commands a CLK signal corresponding to the frequency of the AC current flowing through the coupling capacitor 830, that is, a high-low signal having the same frequency as the frequency of the AC current, and an output voltage signal of the AC current.

The ongoing-ripple calculation unit 713 expects a ripple voltage from the ongoing control signal (AC control signal) being commanded and information stored in the memory 72. The expected ripple voltage is a switching ripple of AC, and a ripple of DC has a small influence and hence is ignored (see FIG. 12).

The reverse-waveform calculation unit 714 calculates a reverse phase waveform (reverse waveform) of the expected ripple voltage, and commands the application DAC 74 to output the reverse phase waveform.

Then, the application DAC 74 generates a reverse phase waveform of the ripple waveform calculated by the CPU 71A and applies the reverse phase waveform to the second DC current detection line DL2.

As output means for applying a ripple reverse phase waveform, an operational amplifier may be further provided to amplify and output the ripple reverse phase waveform in situations such as when the application DAC 74 is sufficient in capacity, or impedance conversion is to be performed.

FIG. 11 provides diagrams illustrating a mechanism of cancelling a ripple voltage.

Figure 11A:
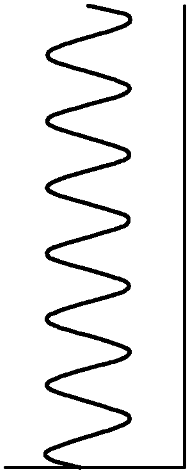
FIGS. 11A, 11B, and 11C (FIG. 11) are diagrams illustrating cancelling of a ripple voltage.
Figure 11B:
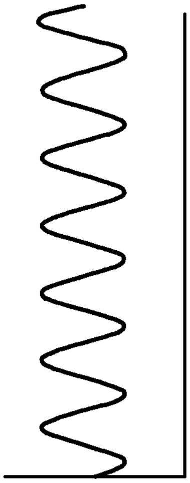
Figure 11C:
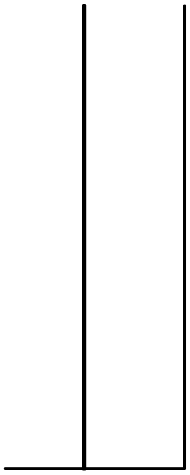

The reverse waveform applicator of the present embodiment applies a reverse phase waveform of a ripple voltage illustrated in FIG. 11B, which is calculated based on ongoing control information and stored memory information, to a current detection line in which a ripple voltage is generated as illustrated in FIG. 11A. Thus, the ripple voltage is cancelled, and an error due to the ripple voltage is reduced in the output DC current detected by the detection ADC 73 as illustrated in FIG. 11C.

FIG. 12 provides diagrams illustrating breakdown of a ripple voltage generated on the upstream side of the current detection element 84128.

A ripple voltage that is generated in the first DC current detection line DL1 located upstream of the current detection element 841 normally has a voltage waveform in which a DC switching ripple and an AC output ripple are combined.

Figure 12C:
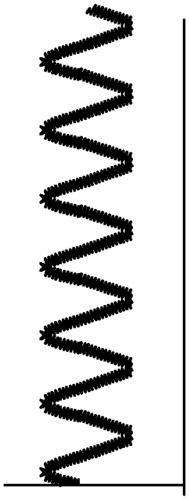
FIGS. 12A, 12B, and 12C (FIG. 12) are diagrams illustrating breakdown of a ripple voltage generated on the upstream side of a DC current detector.
Figure 12B:
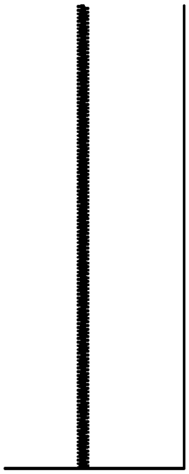
Figure 12A:
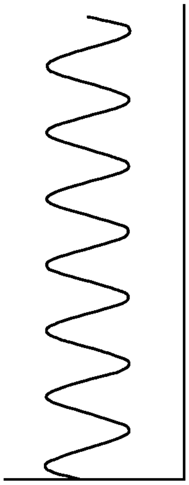

FIG. 12A indicates a ripple that is generated when an AC current flows in, FIG. 12B indicates a ripple that is generated by switching of DC, and FIG. 12C indicates a ripple that appears in the DC current detector 840. In this case, FIG. 12C illustrates a voltage waveform when the AC current reducer 850 is not provided for convenience of description.

For example, when the AC output frequency is 1280 Hz and the DC switching frequency is 50 kHz, the ripple waveform appearing in the second DC current detection line DL2 is a waveform in which the waveform of 1280 Hz and the waveform of 50 kHz are combined as illustrated in FIG. 12C.

In this case, since the inflow current flowing from the AC current does not change regardless of whether the output of the DC voltage is ON or OFF, a ripple voltage generated as a result of the inflow of the AC current when the DC output is OFF is measured in advance and is stored in the memory 72.

The DC switching ripple is not eliminated; however, as found through comparison between FIG. 12A and FIG. 12B, the ripple voltage caused by the AC output is significantly larger than the DC switching ripple. Thus, by applying the reverse phase waveform of the ripple voltage caused by the AC output to cancel the ripple voltage caused by the AC output as described above, the ripple voltage caused by the output DC current detected by the detection ADC 73 decreases, and the detection error caused by the ripple voltage can be greatly reduced.

As described above, according to the present embodiment, the reverse phase waveform of the ripple caused by the AC output is generated and the reverse phase waveform of the ripple voltage is applied to the second DC current detection line DL2 immediately before the detection to cancel the ripple voltage and reduce the error due to the ripple. The detection ADC 73 can accurately detect the output DC current to output an accurate measurement output DC current.

A configuration in which control to apply the reverse phase waveform of the ripple voltage is performed in addition to the control performed by the AC current reducer 850 is described with reference to FIGS. 9, 13, 14, and 27 illustrating configurations of the second embodiment and third to fifth embodiments (described later); however, the AC current reducer does not have to be provided in the configuration to apply the reverse phase waveform of the ripple voltage.

Third Embodiment

In the above-described second embodiment, to detect the voltage with the ripple component cancelled in the detection ADC 73, the reverse phase waveform is output from the application DAC 74 of the power supply control device 70A and is applied to the second DC current detection line DL2. However, without providing the application DAC 74, the power supply control device may detect an output DC current in which a ripple voltage is not cancelled, add a reverse waveform, and output a measurement output DC current.

FIG. 13 is a diagram illustrating a configuration and a flow of current of a power supply device γ according to a third embodiment.

In the present embodiment, a power supply control device 70B in a charging high-voltage power supply 180B inputs a current detected by a detection ADC 73B to a CPU 71B to correct the current, and then outputs the corrected current as a measurement output DC current. At this time, in the CPU 71B of the power supply control device 70B, calculation with a reverse phase waveform applied based on control information and memory information is performed on the current detected by the detection ADC 73B to calculate a detection current with a ripple cancelled, and the calculation result is used as a measurement output DC current. Thus, regarding the measurement output DC current output from the CPU 71B, the error due to the ripple is reduced from the detected current.

Specifically, the power supply control device 70B of the present embodiment creates a reverse phase waveform of a ripple voltage caused by an AC output as illustrated in FIG. 11B based on an AC control signal and a ripple voltage for each situation stored in the memory 72. In the power supply control device 70B, the reverse phase waveform of the ripple voltage caused by the AC output generated through the calculation is added to an output DC current including a ripple voltage detected by the detection ADC 73B to calculate an output DC current with the ripple cancelled as illustrated in FIG. 11C, and the output DC current is output as a measurement output DC current. The host control device 60 can calculate the surface potential of the photoconductor 40 based on the calculated measurement output DC current, and perform image formation control or the like.

As described above, according to the present embodiment, in the power supply control device 70B, since the DC voltage is calculated while the ripple of the detected waveform including the ripple voltage detected by the detection ADC 73B is cancelled in the CPU 71B, the output DC current to be output (measurement output DC current) can be accurately calculated while the one DA converter (application DAC) in the power supply control device 70B is decreased as compared to the configuration in the second embodiment.

To cancel the reverse phase waveform of the ripple in accordance with the ripple voltage included in the detected output DC current, the phase of the reverse phase waveform is matched with the phase of the ripple voltage. Since the above-described power supply control device 70A (70B) outputs the DC control signal and the AC control signal to control the AC voltage and the DC voltage that are outputs, respectively, there is no problem as long as the phases can be matched based on the control signals.

However, in some cases, the phases of the detected ripple voltage and the generated ripple reverse phase waveform are not matched with each other depending on the circuit configuration after the control signals are applied. In this case, the phases are not matched based on the control signals, and hence a mechanism that detects a phase is to be used.

Fourth Embodiment

Thus, according to the present embodiment, a phase detection mechanism is provided in addition to the configuration of the second embodiment illustrated in FIG. 9.

Figure 14:
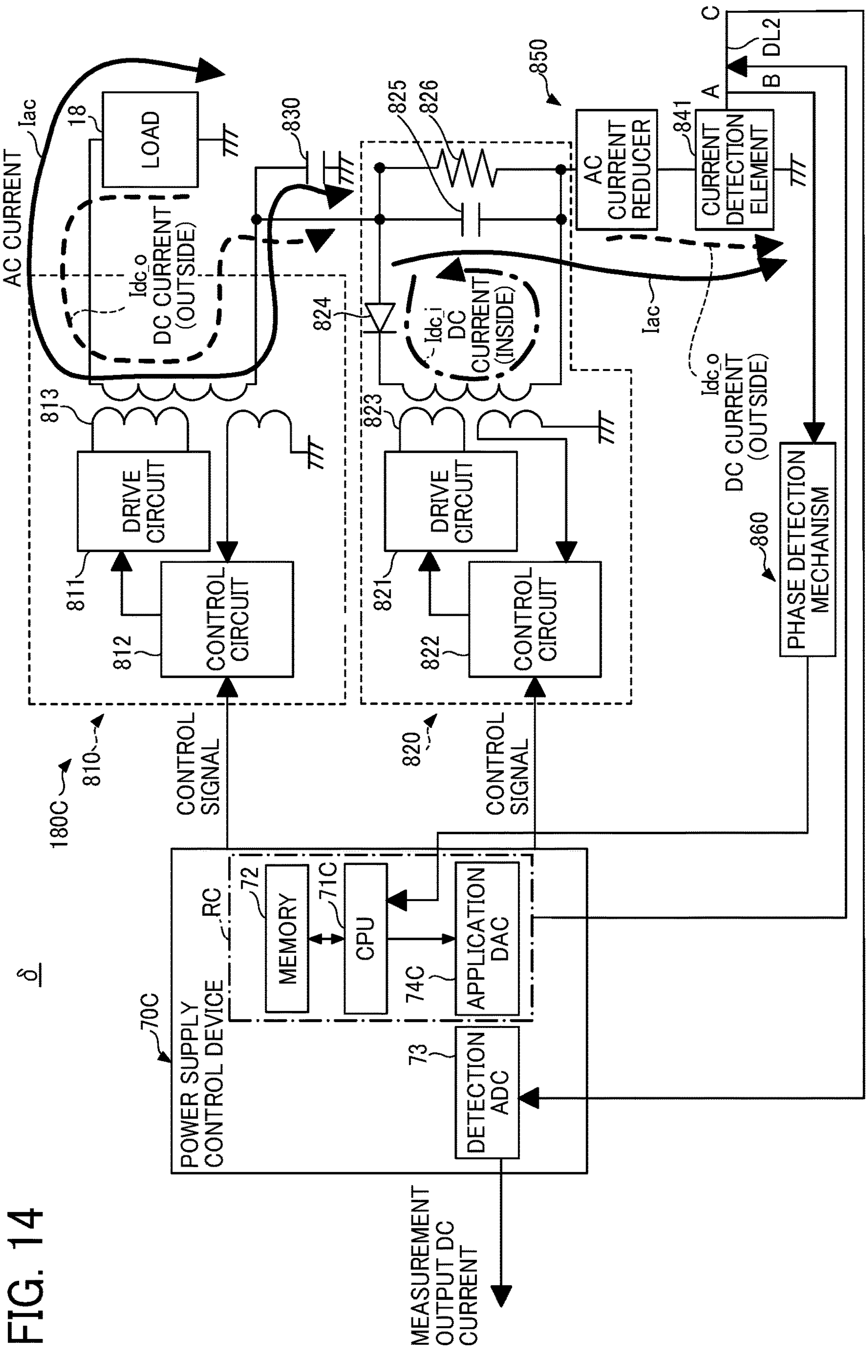
FIG. 14 is a diagram illustrating a configuration and a flow of current of a power supply device according to a fourth embodiment.

FIG. 14 is a diagram illustrating a configuration and a flow of current of a power supply device δ according to a fourth embodiment. In the present embodiment, a phase detection mechanism 860 is provided to connect the second DC current detection line DL2 to a power supply control device 70C in a charging high-voltage power supply 180C.

The phase detection mechanism 860, which is an example of a phase detector (a phase detector circuit), detects the phase of the ripple voltage at a point A of the second DC current detection line DL2 immediately upstream of the DC current detector 840. Consequently, the power supply control device 70C according to the present embodiment applies a reverse phase waveform to a point B on the downstream side with respect to the point A in accordance with the phase of the detected ripple voltage to cancel the ripple in the output DC current detected by the detection ADC 73. In the power supply control device 70C according to the present embodiment, a CPU 71C, the memory 72, and an application DAC 74C function as a reverse waveform applicator RC.

First Circuit Example of Phase Detector

Figure 15:
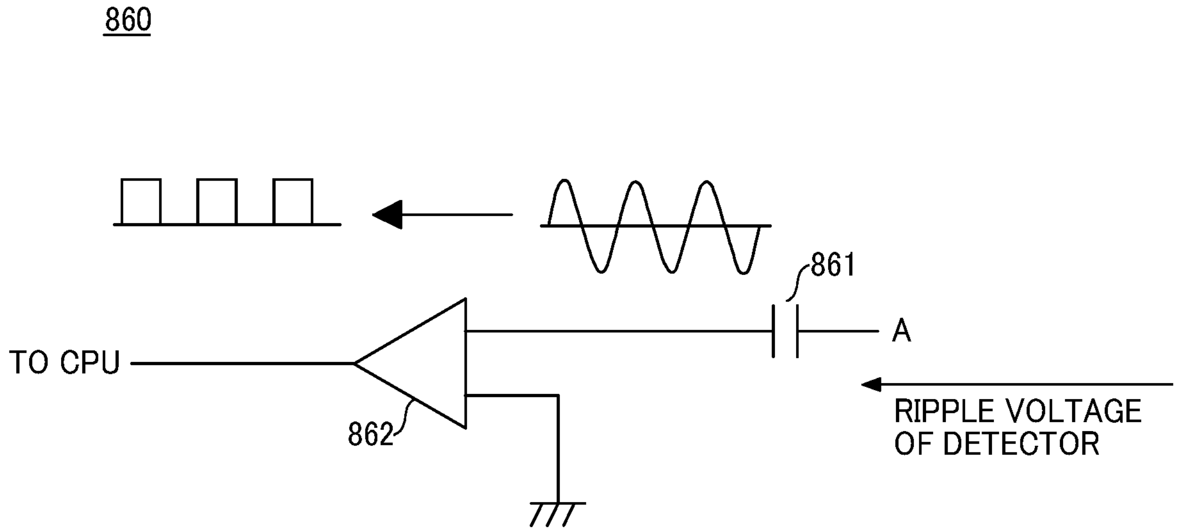
FIG. 15 is a diagram illustrating a first circuit example of a phase detection mechanism.
Figure 16A:
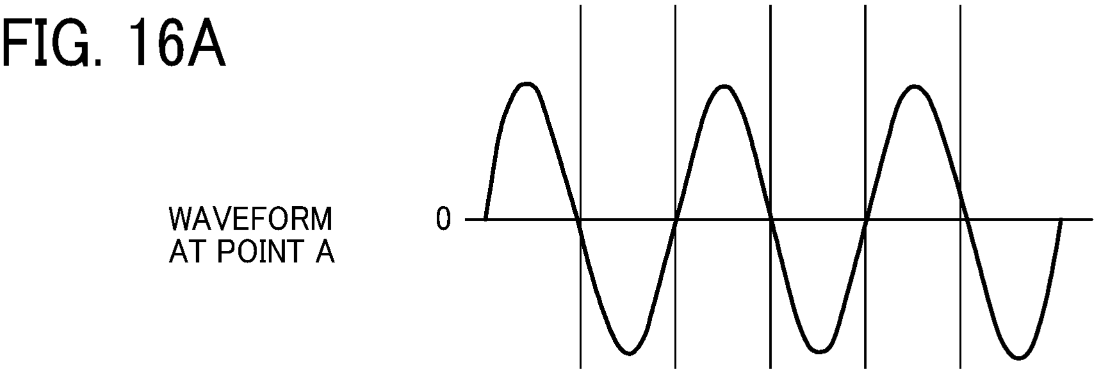
FIGS. 16A, 16B, and 16C (FIG. 16) are diagrams illustrating a waveform at a point A in FIG. 15, a generated rectangular wave, and a phase of an adjusted reverse phase waveform.

FIG. 15 is a diagram illustrating a first circuit example of the phase detection mechanism 860. FIG. 16 provides diagrams illustrating a waveform at a point A in FIG. 15, a generated rectangular wave, and a phase of an adjusted reverse phase waveform.

The phase detection mechanism 860 in FIG. 15 includes a capacitor 861 and a comparator 862 connected to the ground terminal.

Figure 16B:
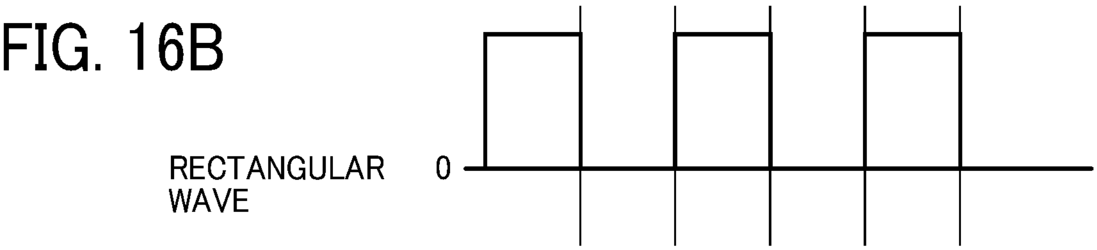
Figure 16C:
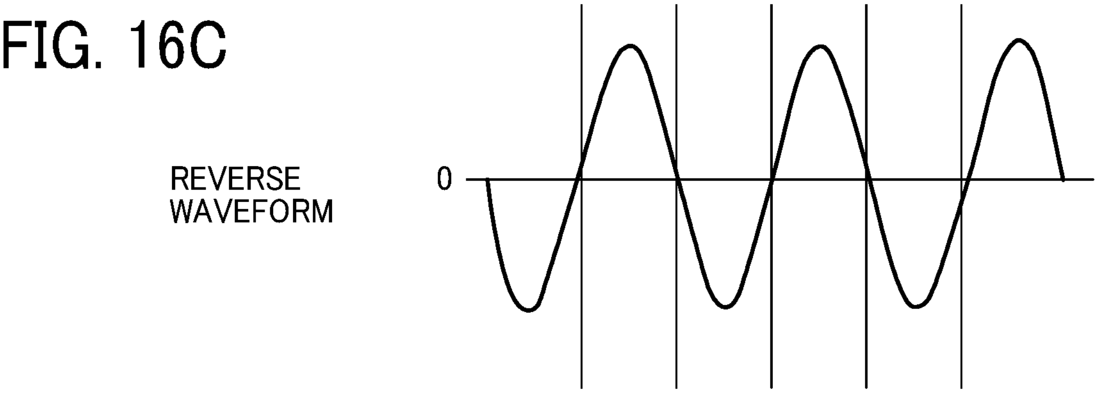

With this configuration, the potential at the point A is coupled by the capacitor 861, and is compared with the GND (0 V) by the comparator 862 to create a rectangular wave in which a + portion is HIGH as illustrated in FIG. 16B. Then, by matching the start of the HIGH of the rectangular wave with the start of the generated reverse phase waveform of the ripple voltage, as illustrated in FIG. 16C, the reverse phase waveform of the ripple voltage matched with the phase of FIG. 16A can be created. As described above, the reverse phase waveform of the expected ripple created through the phase adjustment can perform cancelling in accordance with the phase of the ripple voltage.

When it is difficult to perform the coupling in the comparator 862, a phase detection operation is performed to turn OFF the output of the DC voltage and turn ON the output of the AC voltage, and hence the DC component is reduced to as close as possible to 0 in the comparator 862. Thus, the phase can be detected through comparison with a very small voltage (equal to or less than 0 peak of the ripple) at the terminal connected to the GND.

Second Circuit Example of Phase Detector

Figure 17:
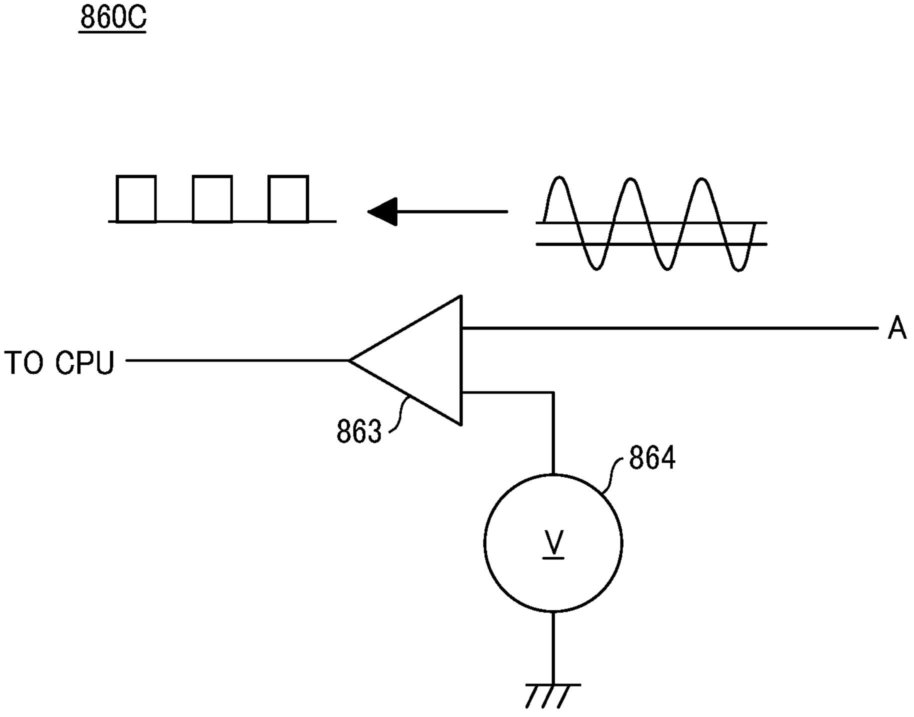
FIG. 17 is a diagram illustrating a second circuit example of a phase detection mechanism.

FIG. 17 is a diagram illustrating a second circuit example of a phase detection mechanism 860C. FIG. 18 provides diagrams illustrating a waveform at a point A in FIG. 17, a rectangular wave generated in the circuit, and a phase of a reverse phase waveform.

The phase detection mechanism 860C in FIG. 17 includes a comparator 863 connected to a constant voltage source 864.

Figures 18A, 18B, 18C:
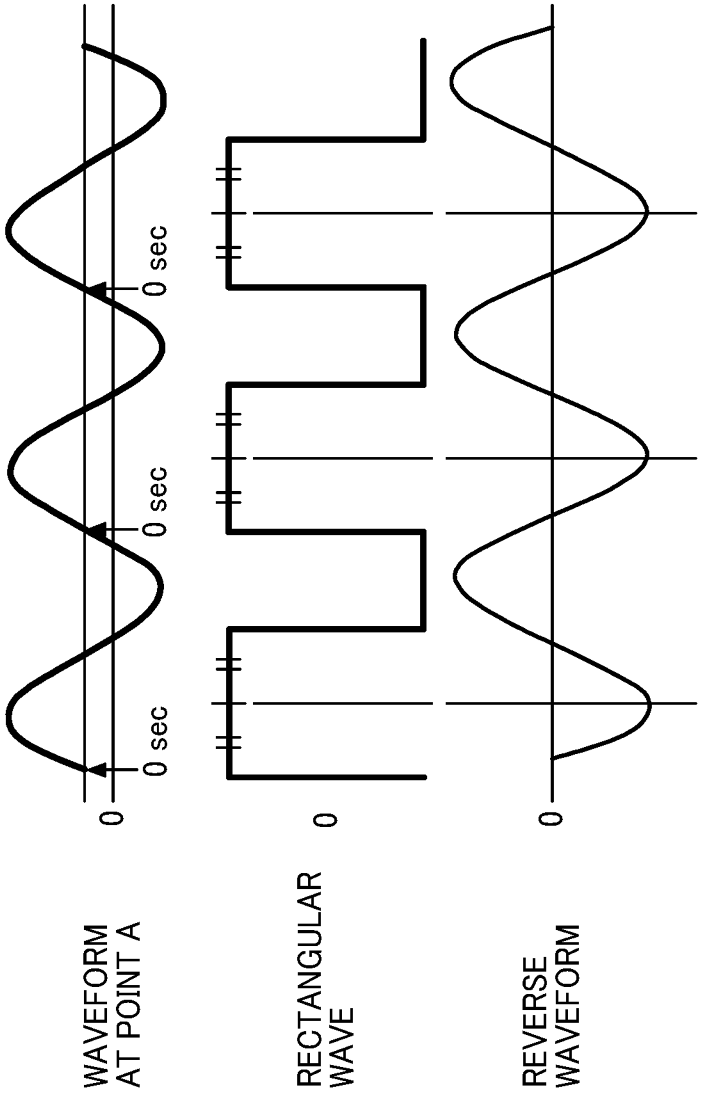
FIGS. 18A, 18B, and 18C (FIG. 18) are diagrams illustrating a waveform at a point A in FIG. 17, a generated rectangular wave, and a phase of an adjusted reverse phase waveform.

In this configuration example, as illustrated in FIG. 18A, the waveform at the point A is at a position shifted to the + side while 0 does not serve as the center of the amplitude. In this case, the duty of the rectangular wave output from the comparator 863 of the phase detection mechanism 860C is not 50% as illustrated in FIG. 18B.

In the CPU 71C of the power supply control device 70C, the rising edge and the falling edge of the rectangular wave in FIG. 18B are checked, and the timing at the center between the edges is determined as the timing of the vertex (the maximum value, the minimum value) of the detected ripple waveform. Thus, by controlling the phase such that the minimum value and the maximum value in the generated ripple reverse phase waveform respectively match the timings of the detected maximum value and minimum value of the ripple waveform, as illustrated in FIG. 18C, a reverse phase waveform of a ripple voltage can be created and output in accordance with the phase in FIG. 18A.

As described above, according to the present embodiment, when the ripple reverse phase waveform is generated, the power supply control device 70C calculates the voltage and phase of control, and generates a reverse phase waveform having a phase matched with the phase of the detected ripple voltage. Then, the ripple reverse phase waveform with the phase matched is applied to a point B that is closer to the detection ADC 73 than the point A (that is, on the downstream side with respect to the position of the second DC current detection line DL2 at which the phase detection mechanism 860 is connected). Thus, the ripple voltage generated due to the inflow of the AC current is cancelled, and the output DC current with the ripple suppressed can be detected by the detection ADC 73.

Thus, according to the present embodiment, by calculating the phase of the ripple voltage, the ripple voltage can be cancelled with higher accuracy, and the output DC current can be detected with higher accuracy.

Fifth Embodiment

While the phase is calculated in the above-described fourth embodiment, it is further desirable to specify the timing of sampling for the output DC current including the ripple voltage.

Figure 19A:
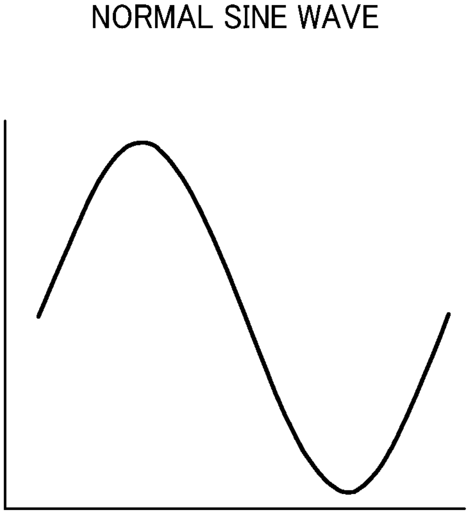
FIGS. 19A and 19B (FIG. 19) are diagrams illustrating example waveforms of a normal sine wave and a distorted waveform when discharge occurs.
Figure 19B:
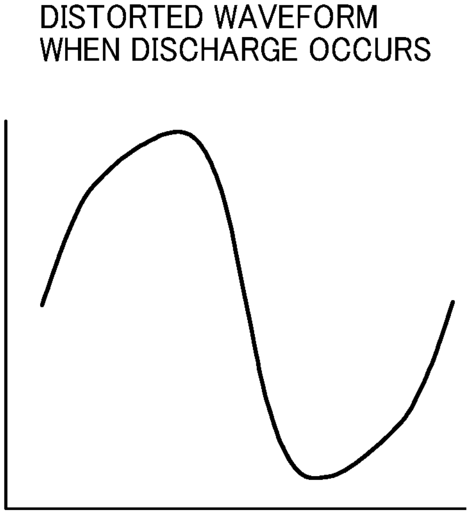

FIGS. 19A and 19B are diagrams illustrating waveforms of a normal sine wave and a distorted waveform when discharge occurs. FIG. 19A illustrates a normal sine wave and FIG. 19B illustrates a distorted waveform when discharge occurs.

In contact charging, as illustrated in FIG. 19A, distortion is hardly generated in the AC waveform. However, in non-contact charging, there is a gap (clearance) between the photoconductor 40 and the charging roller 18, and when the voltage is equal to or higher than a certain value, discharge occurs from the charging roller 18 toward the photoconductor 40 to charge the photoconductor 40. Since a current flows more than a normal situation during the discharge, the AC waveform may be distorted in non-contact charging as illustrated in FIG. 19B.

Moreover, in any one of the first embodiment, the second embodiment, and the fourth embodiment, even when the ripple voltage is generated due to the influence of the AC current by detection of the DC current flowing through a point C immediately upstream of the detection ADC 73, the current can be detected without the influence of the ripple as long as sampling can be performed at a certain position of the ripple waveform and the degree of difference from the average voltage at the certain position can be predicted.

However, when the certain position of the waveform to be measured is near 0 V, a distortion may occur depending on the control circuit. Since the portion is most inclined, the error may be larger compared to the other portions, and hence the portion is desirably avoided.

The degree of distortion changes due to the influence of the gap or the load, and hence the measurement position is desirably a position before distortion. Moreover, distortion varies due to discharge of the charging roller 18 serving as the load, and hence measurement at a position after discharge is desirably avoided. Thus, measurement (sampling) at a certain position in a range from 0 V or higher to the start of discharge is desirable.

Thus, according to the present embodiment, the timing of measurement in the output DC current including the ripple voltage caused by the AC voltage is set to fall within a desirable measurement range in the waveform of the AC voltage.

Figure 20:
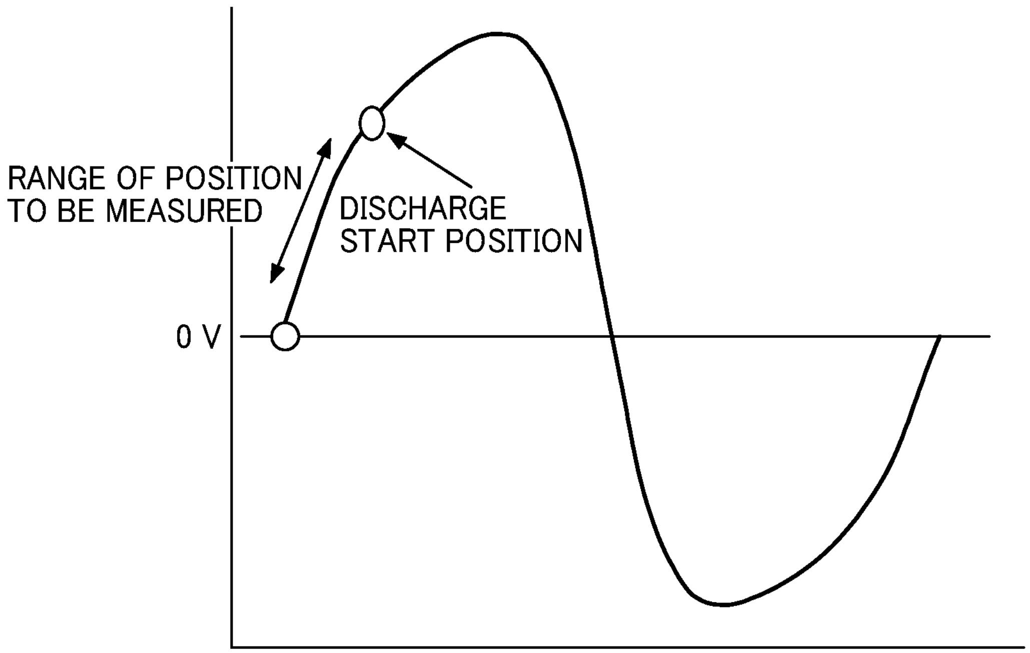
FIG. 20 is a diagram illustrating a range of measurement in an AC waveform.

FIG. 20 is a diagram illustrating a range of measurement in an AC waveform. The position to be measured is desirably a portion higher than 0 V and equal to or lower than a discharge portion indicated by a circle.

Thus, according to the present embodiment, similarly to the fourth embodiment, the phase detection mechanism 860 (860C) detects the phase of the ripple voltage at the point A of the second DC current detection line DL2. A power supply control device 70D (see FIG. 27) derives a certain point of the waveform and obtains the timing of an average-value cross point (0 sec) that is the center of the waveform.

In the present specification, the average-value cross point of 0 sec is a portion that rises to the plus side from the average point of the ripple waveform. For example, in the waveforms illustrated in FIGS. 16A and 20, since the waveform at the point A uniformly transitions with respect to the point 0, the zero cross point that crosses the average value from the − side to the + side is the average-value cross point of 0 sec. In contrast, in the waveform illustrated in FIG. 18A, since the waveform at the point A uniformly transitions around the average value higher than the point 0, the average-value cross point (0 sec) is at a position indicated by an arrow that crosses the average value higher than 0 from the − side to the + side.

Figure 21A:
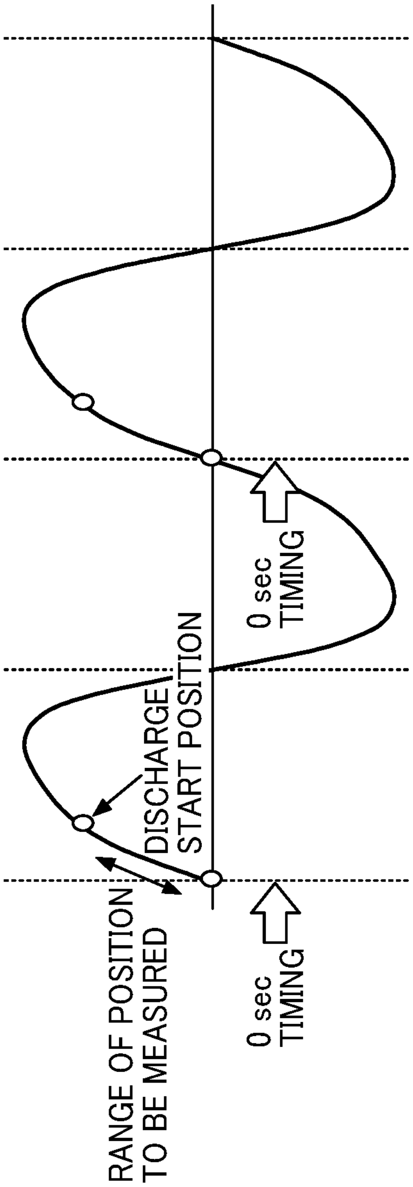
FIGS. 21A and 21B (FIG. 21) are provides diagrams illustrating an average-value cross point (0 sec) in an AC waveform.
Figure 21B:
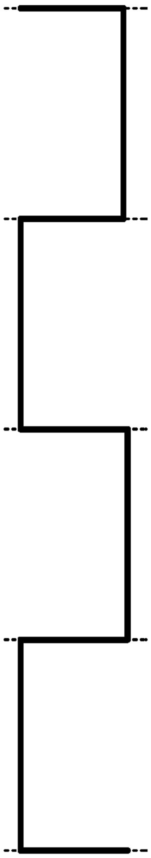

FIG. 21 provides diagrams illustrating a measurement range with respect to an average-value cross point (0 sec) in an AC waveform. As described above, it is desired to determine, as the sampling timing in the output current waveform including the ripple voltage, when the measurement is performed counting from the average-value cross point of 0 sec.

For example, when the AC frequency is 1700 Hz (one cycle ≈0.588 ms), the gap between the charging roller 18 and the photoconductor 40 is 0.005 mm, and the discharge start is after 0.125 ms from 0 sec, it is assumed that 620 V is obtained.

When the ripple voltage is sampled, measurement is desirably performed at or before the start of discharge, and hence the measurement (sampling) is desirably performed within 0.125 ms from the average-value cross point of 0 sec.

Thus, how far from the average-value cross point of 0 sec the measurement is performed is stored in a memory in advance. At this time, when different frequencies or outputs are present, the time for reaching the discharge potential from 0 sec varies depending on the frequency, and hence the time is determined per frequency.

By performing measurement in the range of the waveform set as described above, a numerical value equal to or larger than the value at the average-value cross point (0 sec) and at or before the start of discharge before the waveform is distorted can be measured as the output current including the ripple voltage.

Figure 22:
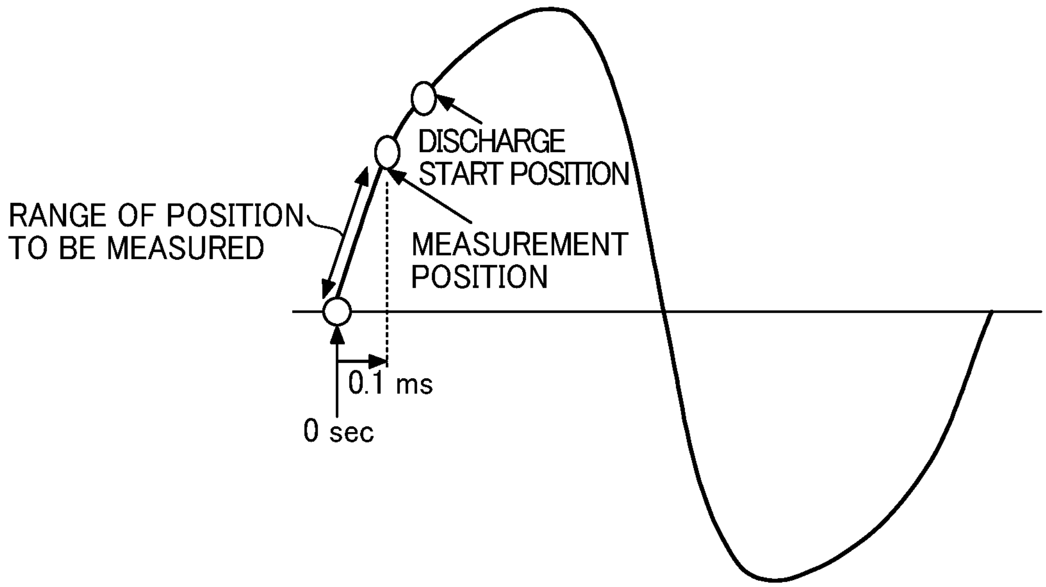
FIG. 22 is a diagram illustrating a measurement timing at a position of measurement in an AC waveform.

FIG. 22 is a diagram illustrating a sampling timing corresponding to a sampling position in one cycle of an AC waveform. The result measurement can be performed at the same position of the waveform by measuring a portion at which the sampling has progressed by 0.1 ms from 0 sec at the latest.

In the present embodiment, without increasing the occupancy rate of the CPU by measuring all waveforms or increasing the number of samplings, as illustrated in FIG. 22, one point is measured within a range allowed by a CPU 71D (see FIG. 27) in one cycle with less distortion of waveform, thereby measuring a stable voltage.

Figure 23:
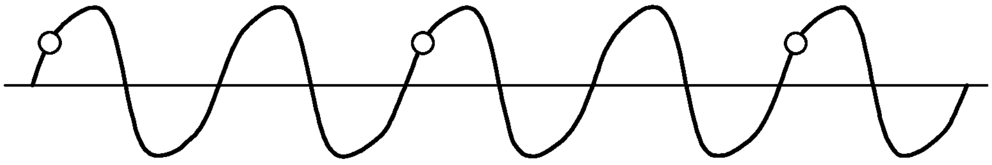
FIG. 23 is a diagram illustrating a sampling position in an AC waveform.
Figure 24:
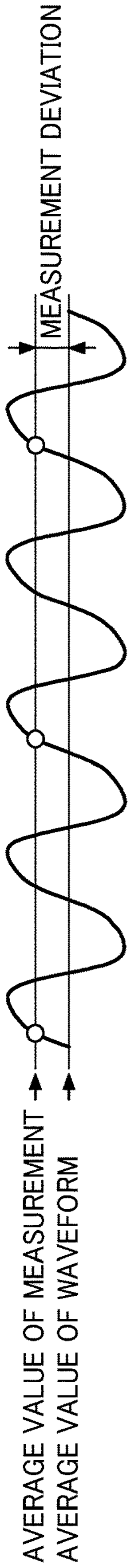
FIG. 24 is a diagram illustrating a measurement deviation of an average of measurement from an average of waveform.

FIG. 23 is a diagram illustrating a sampling position in an AC waveform. FIG. 24 is a diagram illustrating a measurement deviation of the average value of measurement from the average value of waveform.

In the present embodiment, as described above, since the sampling timing after an elapse of a predetermined interval from the average-value cross point is intentionally set, the average value of the measurement is detected while being deviated from the average value of the waveform as illustrated in FIG. 24. Then, when the surface potential of the photoconductor 40 is calculated based on the sampled output DC current, the measurement deviation is to be corrected so that the average value of the waveform can be correctly used.

Figure 27:
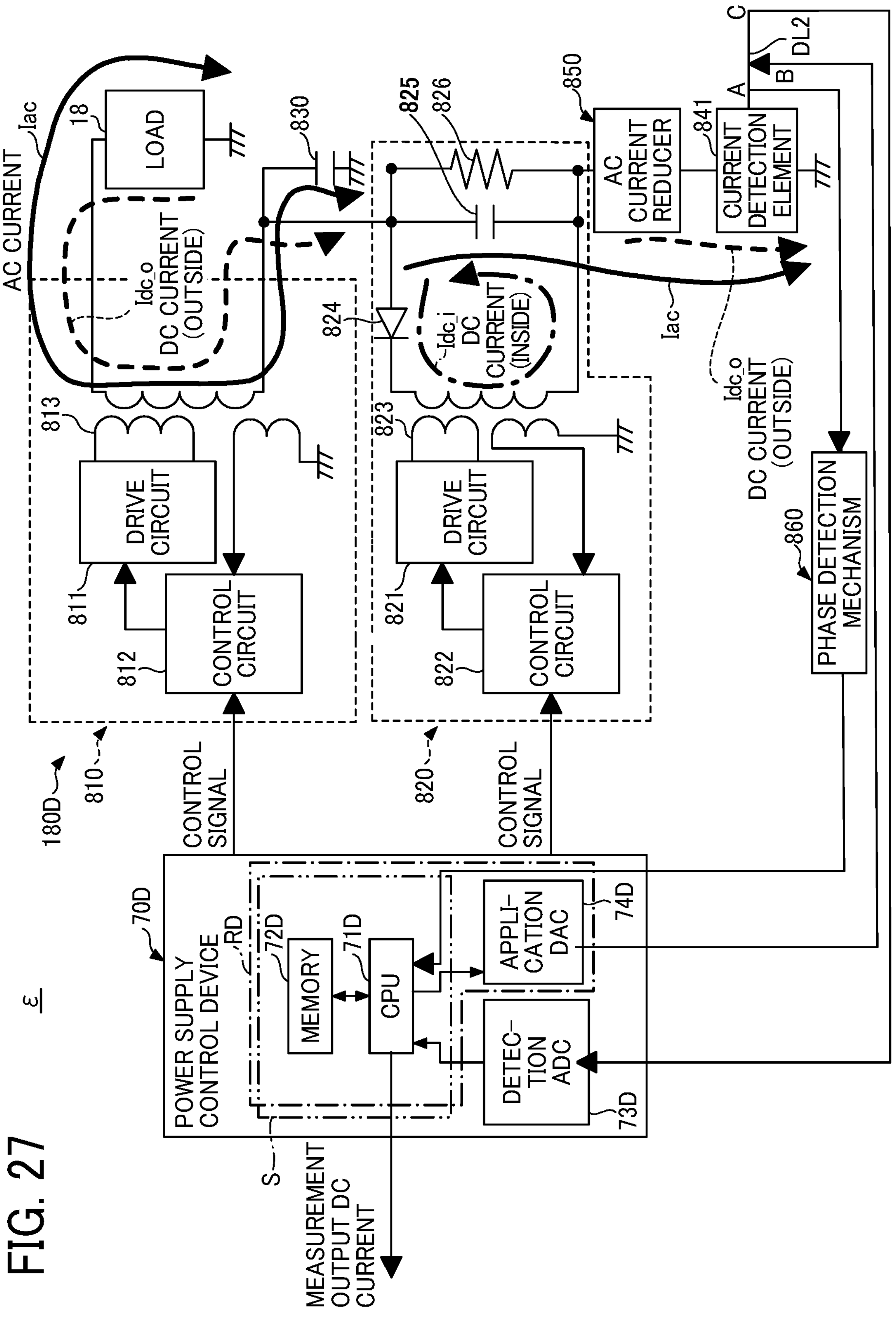
FIG. 27 is a diagram illustrating a configuration and a flow of current of a power supply device according to a fifth embodiment.

For a correction value for correcting the measurement deviation, a deviation is checked in advance to what extent the voltage at a point to be measured deviates from the average per AC voltage designated by the control signal, and the deviation is stored in a memory 72D (see FIG. 27).

FIG. 25 provides diagrams illustrating an example of voltage values of an AC output and a ripple voltage on the downstream side.

Figure 25A:
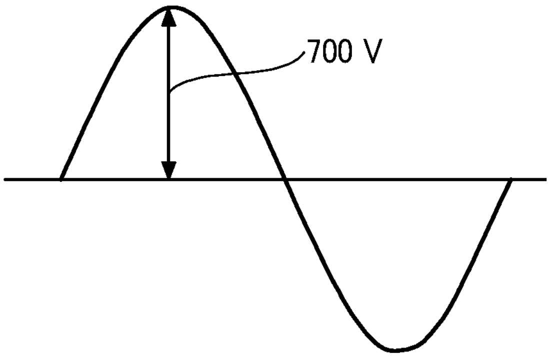
FIGS. 25A, 25B, 25C, and 25D (FIG. 25) are diagrams illustrating an output voltage and a voltage value detected at a sampling timing in a ripple voltage.
Figure 25B:
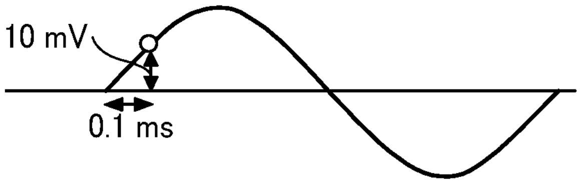

When the maximum value of an AC voltage to be output is 700 V as illustrated in FIG. 25A, the voltage at a sampling timing after an elapse of a predetermined interval of 0.1 ms from the average-value cross point in the corresponding ripple voltage is 10 mV as illustrated in FIG. 25B.

Figure 25C:
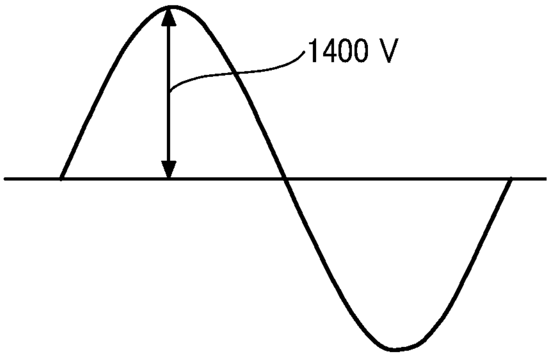
Figure 25D:
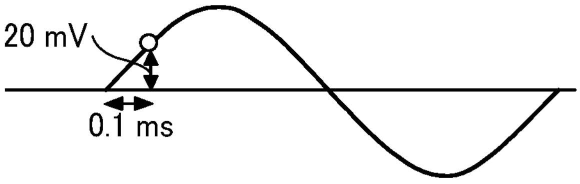

When the maximum value of an AC voltage to be output is 1400 V as illustrated in FIG. 25C, the voltage at a sampling timing after an elapse of a predetermined interval of 0.1 ms from the average-value cross point in the corresponding ripple voltage is 20 mV as illustrated in FIG. 25D.

10 mV illustrated in FIG. 25B and 20 mV illustrated in FIG. 25D correspond to measurement deviations (amounts of deviation) of the average value of the measurement as illustrated in FIG. 24 from the average value of the waveform.

Since the measurement deviation is determined based on the amplitude of the AC voltage, the measurement deviation is stored per AC voltage. Alternatively, when the AC frequency is the same and measurement is performed at the same time, the amount of deviation is proportional to the voltage, and hence the amount of deviation may be measured at several points and converted into a table using the inclination thereof.

FIG. 26 presents an example of a correlation table that indicates correspondence among an AC drive frequency, an AC output value, a sampling timing (measurement point), and a measurement deviation.

As illustrated in the relationship in FIG. 25 and the correlation table in FIG. 26, the measurement deviation (amount of deviation) at the sampling timing (measurement point) also changes in accordance with the AC voltage. Thus, the correlation of the measurement deviation per AC frequency is converted into a table or a graph and is saved in a memory per AC frequency.

At this time, setting is made such that the voltage at the measurement point in the output value of the frequency does not exceed the discharge start voltage. Thus, an expression “detected measurement value−average-value deviation amount=average value” is established.

After the measurement, the amount of deviation is added to (subtracted from) the averaged numerical value to eliminate an error in the expected ripple voltage and to generate a reverse phase waveform with the deviation adjusted, and the ripple in the output DC current is cancelled more precisely to obtain an accurate measurement value (measurement output DC current).

FIG. 27 is a diagram illustrating a configuration and a flow of current of a power supply device c according to a fifth embodiment. The present embodiment differs from the fourth embodiment in that the power supply control device 70D inputs a current detected by a detection ADC 73D to the CPU 71D and then outputs a current as a measurement output DC current. In the power supply control device 70D according to the present embodiment, the CPU 71D, the memory 72D, and an application DAC 74D function as a reverse waveform applicator RD, and the CPU 71D and the memory 72D function as a measurement waveform selection corrector S.

Figure 28:
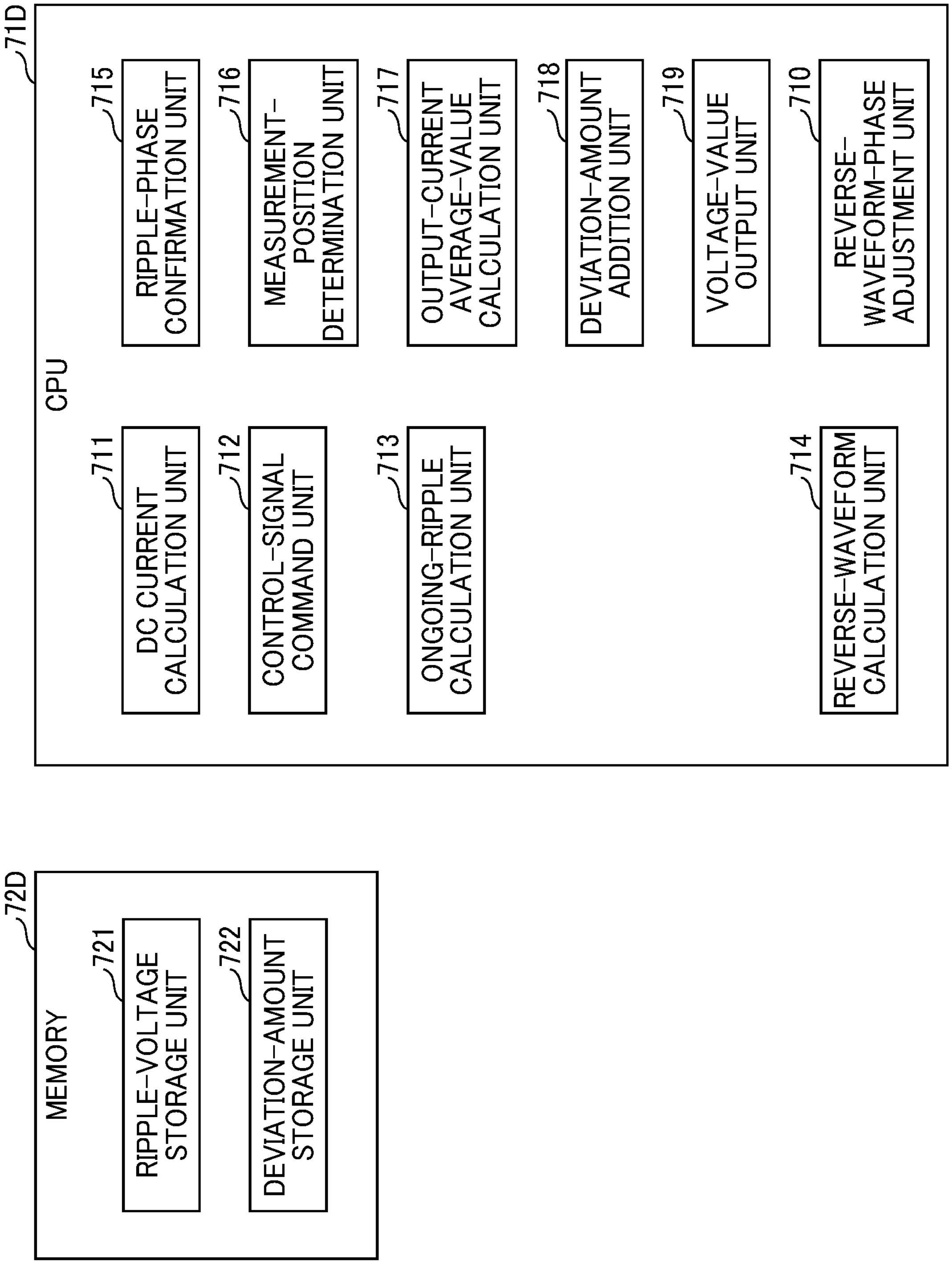
FIG. 28 is a functional block diagram illustrating functional blocks in a memory and a CPU of a power supply control device according to the fifth embodiment.

FIG. 28 is a functional block diagram illustrating functional blocks in the memory 72D and the CPU 71D of the power supply control device 70D according to the fifth embodiment.

The memory 72D includes a ripple-voltage storage unit (memory) 721 and a deviation-amount storage unit (memory) 722. The ripple-voltage storage unit 721 stores a ripple voltage per designated AC voltage in the control signal. The deviation-amount storage unit 722 stores the correlation of the measurement deviation per AC frequency converted into a table or a graph as illustrated in FIG. 26.

The CPU 71D includes, in addition to the above-described DC current calculation unit 711, control-signal command unit 712, ongoing-ripple calculation unit 713, and reverse-waveform calculation unit 714, a ripple-phase confirmation unit 715, an output-current average-value calculation unit 716, a measurement-position determination unit 717, a deviation-amount addition unit 718, a voltage-value output unit 719, and a reverse-waveform-phase adjustment unit 710 in an executable manner.

In the present embodiment, as preliminary preparation, the relationship among the AC frequency, the AC voltage, the time from the average-value cross point of 0 sec, and the amount of deviation from the average value is measured and stored in the deviation-amount storage unit 722 of the memory 72D in advance.

The ripple-phase confirmation unit 715 confirms the phase of a ripple waveform to be measured, and confirms the position of the average-value cross point of 0 sec.

The measurement-position determination unit 717 determines how far from the average-value cross point of 0 sec the measurement is performed, that is, determines a sampling timing (measurement point) in accordance with the AC frequency.

The DC current calculation unit 711 and the output-current average-value calculation unit 716 perform measurement and calculate an average.

The deviation-amount addition unit 718 adds (subtracts) a deviation voltage corresponding to the output voltage to (from) the average voltage.

That is, the average value of the measurement values is calculated by an expression “measurement value−average-value deviation amount=average value”.

The voltage-value output unit 719 transmits the average value of the measurement values, which is obtained by subtracting an average-value deviation amount from a DC current value at a measurement point for the DC current detected by the detection ADC 73D, as a measurement output DC current to the host control device 60 for predicting the surface potential of the photoconductor 40.

Like the fourth embodiment, the reverse-waveform-phase adjustment unit 710 creates a reverse phase waveform of a ripple voltage in accordance with the detected phase and outputs the reverse phase waveform.

In the present embodiment, even when the waveform is distorted by the non-contact charging as described above, by designating the measurement point, recognizing the deviation amount, and performing correction, a ripple error is suppressed, and the output DC current can be accurately detected even with the distorted waveform.

According to one or more embodiments described above, in the power supply device that detects the DC current at the position at which an inflow of the AC voltage occurs, a detection error can be reduced, while preventing the increase in cost.

The above-described embodiments are just examples and do not limit the present disclosure. Modifications and alterations of the above-described embodiments can be made without departing from the scope of the appended claims.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A power supply device that applies a voltage in which a DC voltage and an AC voltage are superimposed on each other to a charging member that charges an image bearer, comprising:

an AC voltage generation circuit that generates the AC voltage;

a DC voltage generation circuit that generates the DC voltage;

a DC current detection circuit provided on an output terminal side of the DC voltage generation circuit and that detects an output DC current flowing into the image bearer; and a reverse waveform applicator circuit that applies a reverse phase waveform of a ripple voltage expected in the DC current detection circuit to the DC current detection circuit.

2. The power supply device according to claim 1, wherein the DC current detection circuit includes:

a detection analog-to-digital (AD) converter circuit that detects the output DC current flowing into the image bearer; and a current detection element including a resistor of the detection AD converter circuit, and wherein the reverse waveform applicator circuit applies the reverse phase waveform of the ripple voltage to a DC current detection line between the detection AD converter circuit and the current detection element.

3. The power supply device according to claim 2, wherein the reverse waveform applicator circuit is configured to output a control signal for causing the AC voltage generation circuit to generate a designated AC voltage, and wherein the reverse waveform applicator circuit includes:

a ripple-voltage memory that stores in advance a ripple waveform to be generated per designated AC voltage of the control signal;

processing circuitry configured to expect a ripple waveform to be generated based on an ongoing control signal and calculate a reverse waveform of the expected ripple waveform; and a digital-to-analog (DA) converter circuit that generates the calculated reverse waveform of the ripple waveform and outputs the generated reverse waveform to the DC current detection line.

4. The power supply device according to claim 3, further comprising:

a phase detector circuit that detects a phase of a ripple voltage of the output DC current in the DC current detection line, wherein the reverse waveform applicator circuit outputs the calculated reverse waveform of the ripple waveform to a position located downstream of a position at which the phase detector circuit is connected of the DC current detection line in accordance with the detected phase of the ripple voltage.

5. The power supply device according to claim 4, wherein the reverse waveform applicator circuit further includes:

a deviation-amount memory that stores in advance a relationship of a deviation amount of an actual detection value of a detection value at a measurement point for a generated ripple voltage per designated AC frequency, and wherein the processing circuitry is configured to expect a ripple waveform regarding a deviation amount based on the control signal and the stored deviation amount at the measurement point and calculate a reverse waveform of the expected ripple waveform regarding the deviation amount.

6. A power supply device that applies a voltage in which a DC voltage and an AC voltage are superimposed on each other to a charging member that charges an image bearer, comprising:

an AC voltage generation circuit that generates the AC voltage;

a DC voltage generation circuit that generates the DC voltage; and a control device connected to an output terminal side of the DC voltage generation circuit and configured to output a control signal for causing the AC voltage generation circuit to generate a designated AC voltage and calculate an output DC current flowing into the image bearer, wherein the control device includes:

an AD converter circuit connected to the output terminal side of the DC voltage generation circuit and that detects a DC current;

a ripple-voltage memory that stores in advance a ripple waveform to be generated per designated AC voltage of the control signal; and processing circuitry configured to expect a ripple waveform to be generated based on an ongoing control signal, calculate a reverse waveform of the expected ripple waveform, and set a value obtained by adding the calculated reverse waveform to a DC current including a detected ripple as the output DC current.

7. An image forming apparatus comprising:

the power supply device according to claim 1;

the image bearer;

the charging member configured to charge the image bearer; and a control device configured to calculate a surface potential of the image bearer based on the output DC current.

8. An image forming apparatus comprising:

the power supply device according to claim 6;

the image bearer; and the charging member configured to charge the image bearer;

the control device further configured to calculate a surface potential of the image bearer based on the output DC current.

* * * * *